US009924405B2

United States Patent
Chen et al.

(10) Patent No.: US 9,924,405 B2
(45) Date of Patent: Mar. 20, 2018

(54) METHOD FOR BUFFER STATUS REPORT IN DUAL CONNECTIVITY

(71) Applicant: Industrial Technology Research Institute, Hsinchu (TW)

(72) Inventors: Chun-Chia Chen, New Taipei (TW); Hung-Chen Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 172 days.

(21) Appl. No.: 14/504,447

(22) Filed: Oct. 2, 2014

(65) Prior Publication Data

US 2015/0098322 A1 Apr. 9, 2015

Related U.S. Application Data

(60) Provisional application No. 61/886,751, filed on Oct. 4, 2013.

(51) Int. Cl.
*H04W 28/02* (2009.01)
*H04W 72/04* (2009.01)
(Continued)

(52) U.S. Cl.
CPC ... *H04W 28/0278* (2013.01); *H04W 28/0252* (2013.01); *H04W 28/08* (2013.01);
(Continued)

(58) Field of Classification Search
CPC ............. H04W 28/0278; H04W 28/08; H04W 28/0252; H04W 72/0486; H04W 88/08; H04W 72/0413; H04L 47/15
(Continued)

(56) References Cited

U.S. PATENT DOCUMENTS

2010/0115355 A1 5/2010 Hsu
2013/0176988 A1* 7/2013 Wang ............... H04W 28/08
370/331
(Continued)

FOREIGN PATENT DOCUMENTS

CN 103039109 A 4/2013
CN 103139918 A 6/2013
(Continued)

OTHER PUBLICATIONS

Seungjune Yi et al, Radio Protocols for LTE and LTE-Advanced, Library of Congress Cataloging-in-Publication Data, XP002753035, John Wiley & Sons Singapore Pte. Ltd., Jan. 1, 2012, pp. 237-259.

*Primary Examiner* — Walli Butt
(74) *Attorney, Agent, or Firm* — Winston Hsu

(57) ABSTRACT

A method for buffer status report (BSR) in dual connectivity for a communication device in a wireless communication system is disclosed. The method comprises connecting to at least two base stations including a first base station and a second base station in the wireless communication system, receiving a BSR configuration from the first base station, wherein the BSR configuration indicates a calculation scheme for a BSR, and calculating buffer sizes indicated in a first BSR and a second BSR respectively for the first base station and the second base station according to the calculation scheme in the received BSR configuration, wherein at least a first logical channel of a first logical channel group reported by the first BSR and at least a second logical channel of a second logical channel group reported by the second BSR are mapped to the same split radio bearer.

16 Claims, 26 Drawing Sheets

(51) Int. Cl.
  *H04W 28/08* (2009.01)
  *H04L 12/801* (2013.01)
  *H04W 88/08* (2009.01)

(52) U.S. Cl.
  CPC ... *H04W 72/0413* (2013.01); *H04W 72/0486* (2013.01); *H04L 47/15* (2013.01); *H04W 88/08* (2013.01)

(58) Field of Classification Search
  USPC ......... 370/228, 252, 328, 329, 331; 375/219
  See application file for complete search history.

(56) References Cited

U.S. PATENT DOCUMENTS

| | | | |
|---|---|---|---|
| 2014/0126399 A1* | 5/2014 | Damnjanovic ... | H04W 72/1252 370/252 |
| 2015/0085800 A1* | 3/2015 | Sivanesan ............ | H04W 24/04 370/329 |
| 2015/0110040 A1* | 4/2015 | Zhao ................. | H04W 72/1252 370/329 |
| 2015/0230082 A1* | 8/2015 | Li ..................... | H04W 28/0278 370/252 |
| 2015/0358838 A1* | 12/2015 | Wei ....................... | H04W 24/04 370/228 |
| 2016/0174210 A1* | 6/2016 | Lee ................... | H04W 72/1284 370/329 |
| 2016/0198491 A1* | 7/2016 | Lee ................... | H04W 72/1284 455/450 |

FOREIGN PATENT DOCUMENTS

| | | |
|---|---|---|
| EP | 2 775 773 A1 | 9/2014 |
| WO | 2011100492 A1 | 8/2011 |
| WO | 2013104413 A1 | 7/2013 |

* cited by examiner

| The mapping table: loading vs. ratio | | | |
|---|---|---|---|
| | High | Medium | low |
| MeNB | 0.2 | 0.4 | 0.6 |
| SeNB | 0.3 | 0.6 | 0.9 |

FIG. 20

METHOD FOR BUFFER STATUS REPORT IN DUAL CONNECTIVITY

CROSS REFERENCE TO RELATED APPLICATIONS

This application claims the benefit of U.S. Provisional Application No. 61/886,751, filed on Oct. 4, 2013 and entitled "Wireless apparatuses, wireless systems, and methods for UL Resources Allocation", the contents of which are incorporated herein in their entirety.

BACKGROUND OF THE INVENTION

1. Field of the Invention

The present invention relates to a method used in a communication device in a wireless communication system, and more particularly, to a method for buffer status report in dual connectivity.

2. Description of the Prior Art

3GPP in Release 12 proposes dual connectivity for increasing user's throughput. Dual connectivity to at least two cells may be served by different evolved NodeBs (eNB), linked with non-ideal backhaul, e.g., there may be an eNB in charge of a cluster of cells. Therefore, a user equipment (UE) may be served by multiple eNBs when it is in dual connectivity mode.

Under framework of the dual connectivity, traffic streams may be split over more than one eNBs depending on QoS requirements of each traffic type, loading situation, channel condition, and the combination thereof. In detail, in Dual Connectivity, a radio bearer, for which its radio protocols are located in both a master eNB (hereafter called MeNB) and a secondary eNB (SeNB) to use both the MeNB and the SeNB resources, is defined as a split radio bearer. Specifically, for a split radio bearer, the MeNB is U-plane connected to the S-GW via S1-U and the (shared) PDCP routs PDCP PDUs to the RLC entity (namely M-RLC) related to MeNB and the RLC entity related to SeNB (namely S-RLC) for data transmission. Please refer to FIG. 1 for uplink transmission of split radio bearers.

FIG. 1 illustrates protocol structure of a UE connecting to a MeNB and a SeNB. As shown in FIG. 1, uplink data of the radio bearer RB1 starts to be split between packet data convergence protocol (PDCP) entity and radio link control (RLC) entity of the UE. For the radio bearer RB1, there is a shared PDCP entity and two RLC entities M-RLC and S-RLC and two MAC entities M-MAC and S-MAC at the UE for uplink data transmission to the MeNB and SeNB. In detail, the UE transmits uplink data of the radio bearer RB1 from the PDCP entity to the RLC entity M-RLC and the MAC entity M-MAC toward the MeNB, and simultaneously to the RLC entity S-RLC and the MAC entity S-MAC toward the SeNB. As can be seen, uplink data carried by the radio bearer RB1 is split over the MeNB and SeNB. It is noted that this kind of radio bearer is called a split radio bearer in this article. On the other hand, a radio bearer on which the uplink data is not split over multiple eNBs is called a non-split radio bearer.

For uplink resource allocation, a buffer status report (BSR) report is transmitted from a UE to an eNB, so that the eNB can allocates accurate amount of uplink resource to the UE for uplink data transmission. In detail, a buffer size indicated in the BSR report is calculated based on total data amount in PDCP buffer and RLC buffer of logic channels (LCs) of a logical channel group (LCG). In addition, the reported buffer size is mapping to an index based on a buffer size table predetermined in the eNB and the UE. The BSR report can be a short BSR report or a long BSR report, and is reported with MAC sub-header and MAC CE. A format of MAC sub-header and MAC CE for BSR report should be well known in the art, so it is omitted herein.

The applicant notices a problem associated to the BSR report based on the current specification. Please refer to FIG. 2, which illustrates non-split radio bearers according to the prior art. As shown in FIG. 2, it is one to one mapping between radio bearer and logical channel in a UE, i.e. radio bearers RB1-RBn map to logical channels LC1-LCn respectively. However, in dual connectivity, it is never concerned that how the UE reports the BSR for a split radio bearer. Please refer back to FIG. 1, the split radio bearer RB1 is mapped to two logical channels M-LC1 and S-LC1 which are maintained in two MAC entities M-MAC and S-MAC respectively. Accordingly, both MAC entities M-MAC and S-MAC will send BSRs associated with the corresponding logic channel M-LC1/S-LC1 of the split radio bearer to the MeNB and SeNB, respectively. Since there is only a shared PDCP entity for the split radio bearer, based on the above-mentioned manner, the PDCP buffer size of the split radio bearer would unavoidable be included in both the BSRs associated with the corresponding logic channel M-LC1/S-LC1. Consequently, the reported buffer size may exceed the real uplink data amount that the UE needs to transmit. Both MeNB and SeNB may allocate the uplink resource according to the received BSRs and the uplink resource would be wasted accordingly because the PDCP buffer size is doubly counted.

SUMMARY OF THE INVENTION

It is there for an objective to provide a method for buffer status report in dual connectivity to solve the above problem.

The present invention discloses a method for buffer status report (BSR) in dual connectivity for a communication device in a wireless communication system. The method comprises connecting to at least two base stations including a first base station and a second base station in the wireless communication system, receiving a BSR configuration from the first base station, wherein the BSR configuration indicates a calculation scheme for a BSR, and calculating buffer sizes indicated in a first BSR and a second BSR respectively for the first base station and the second base station according to the calculation scheme in the received BSR configuration, wherein at least a first logical channel of a first logical channel group reported by the first BSR and at least a second logical channel of a second logical channel group reported by the second BSR are mapped to the same split radio bearer.

The present invention discloses a method for buffer status report (BSR) in dual connectivity for a first base station in a wireless communication system. The method comprises assigning a BSR configuration to a communication device of the wireless communication system to indicate the communication device how to calculate a buffer size indicated in a BSR.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 11-26 illustrate schematic diagrams of several exemplary embodiments.

DETAILED DESCRIPTION

Figure 1:
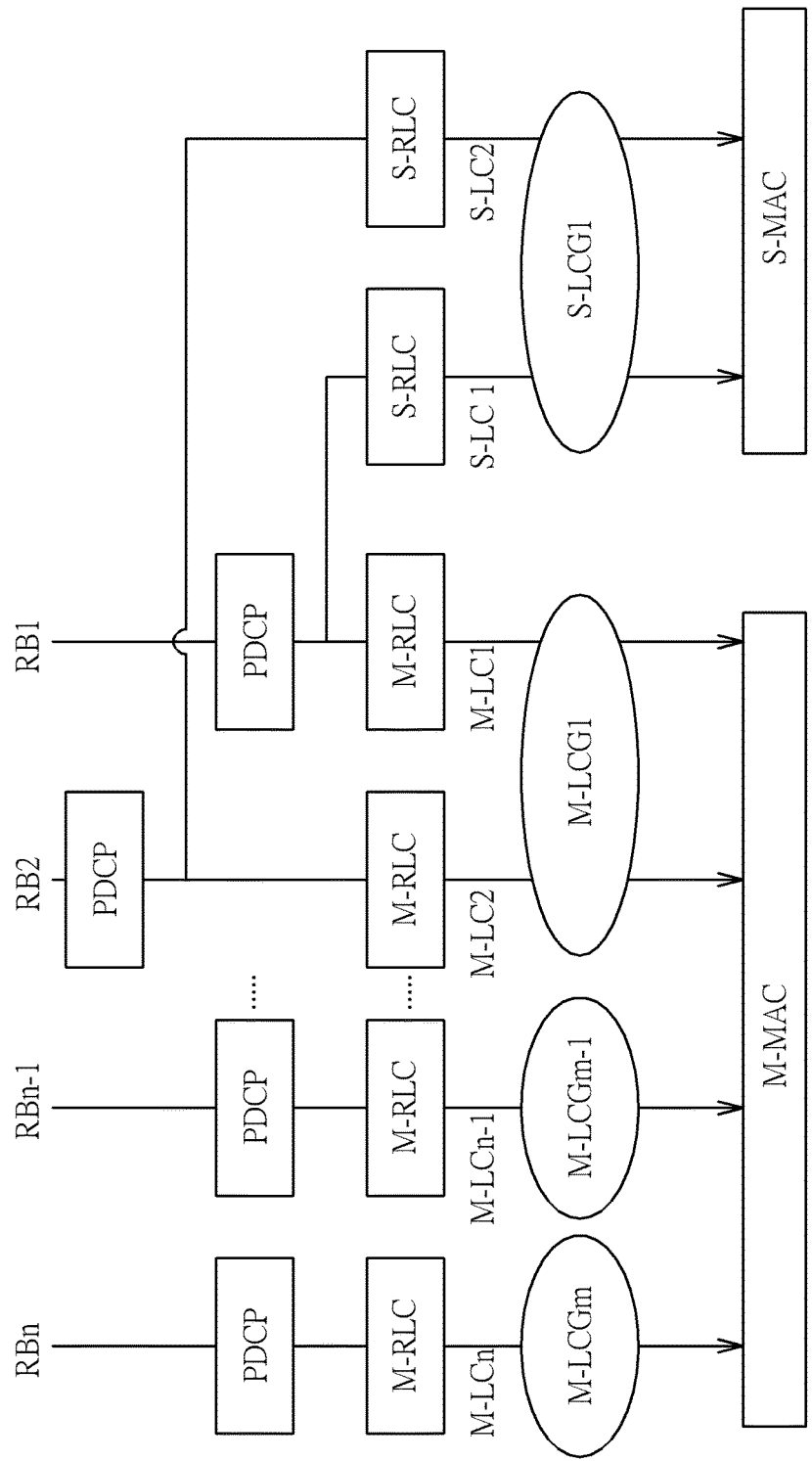
FIG. 1 illustrates a schematic diagram of protocol structure of a user equipment.
Figure 2:
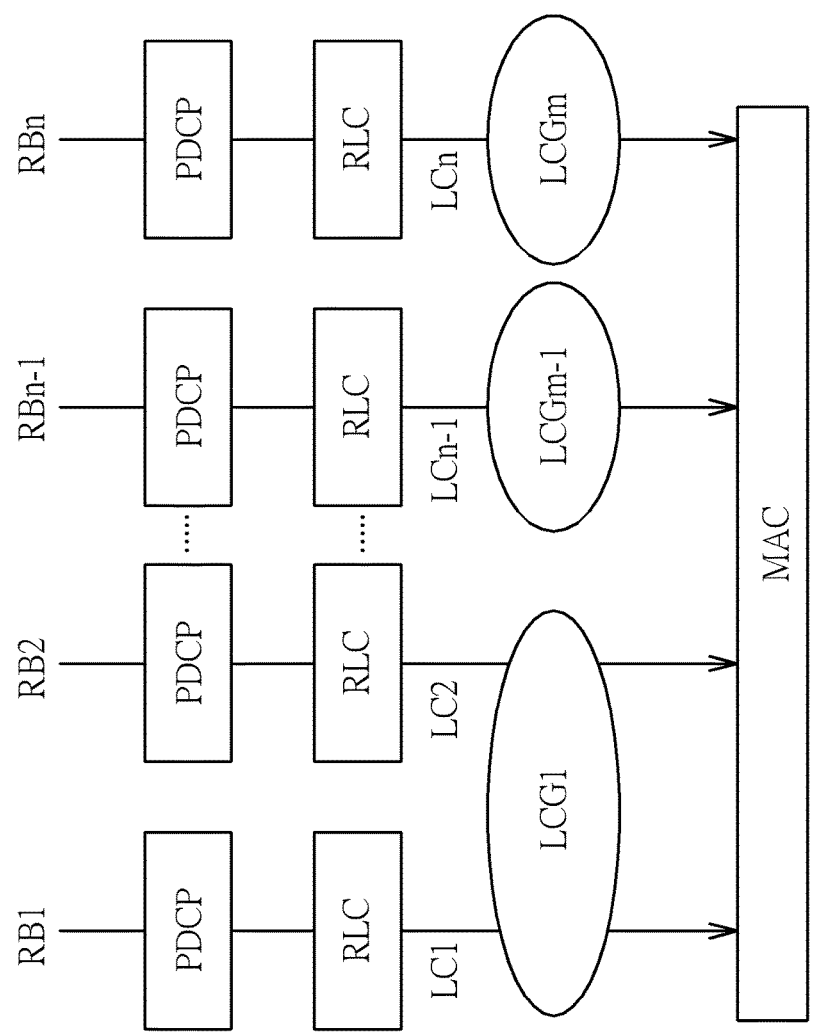
FIG. 2 illustrates a schematic diagram of non-split radio bearers according to the prior art.
Figure 3:
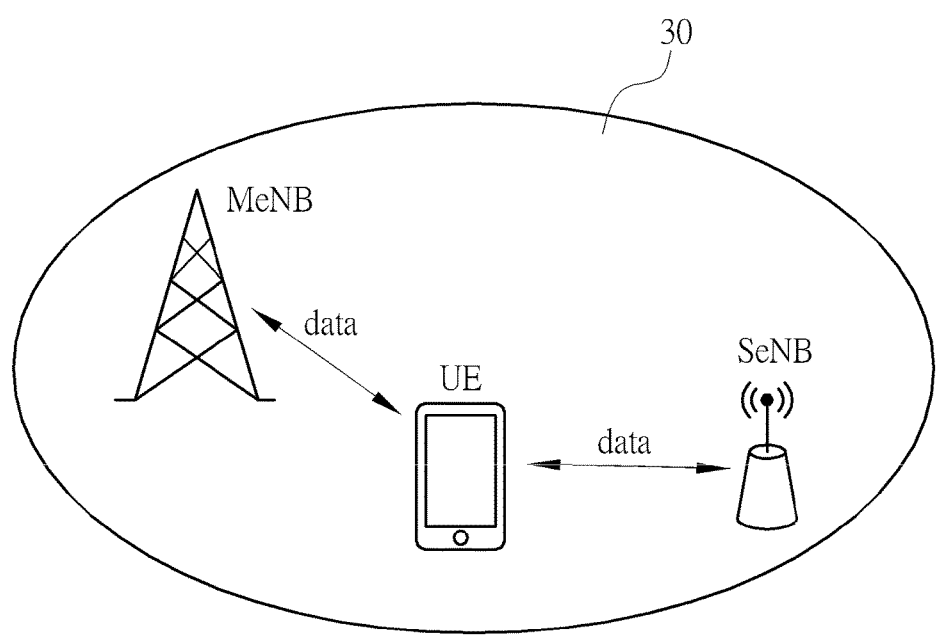
FIG. 3 illustrates a schematic diagram of a wireless communication system.

Please refer to FIG. 3, which is a schematic diagram of a wireless communication system 30. The wireless communication system 30 is a LTE/LTE-Advanced system or other mobile communication systems, and is briefly composed of at least two network nodes, i.e. a master eNB (hereafter called MeNB) and a secondary eNB (hereafter called SeNB), and a user equipment (UE). Note that, FIG. 3 is simply utilized for illustrating the structure of the wireless communication system 30, where the number of UEs and eNBs are not limited herein. The UEs can be devices such as mobile phones, computer systems, machine type devices, etc. Besides, the network node and the UE can be seen as a transmitter or receiver according to transmission direction, e.g., for uplink (UL), the UE is the transmitter and the network node is the receiver, and for downlink (DL), the network node is the transmitter and the UE is the receiver.

Figure 4:
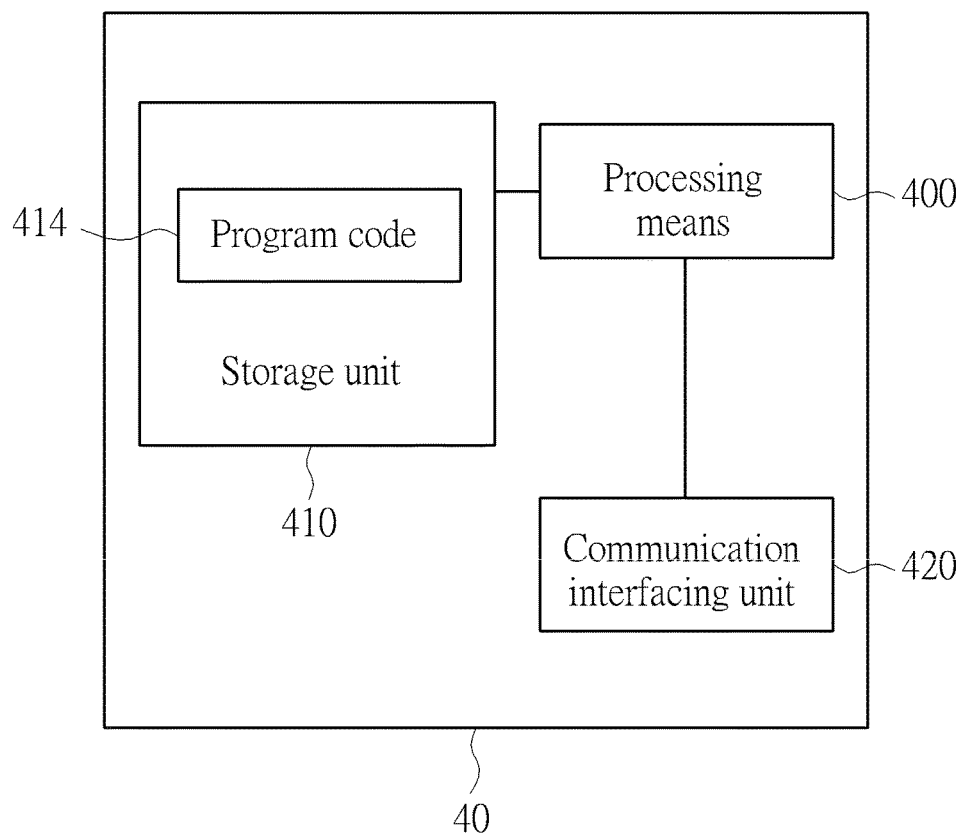
FIG. 4 illustrates a schematic diagram of an exemplary communication device.

FIG. 4 illustrates a schematic diagram of an exemplary communication device 40. The communication device 40 can be the UE, MeNB, or SeNB shown in FIG. 3. The communication device 40 may include a processing means 400 such as a microprocessor or Application Specific Integrated Circuit (ASIC), a storage unit 410 and a communication interfacing unit 420. The storage unit 410 may be any data storage device that can store program code 414, for access by the processing means 400. Examples of the storage unit 410 include but are not limited to a subscriber identity module (SIM), read-only memory (ROM), flash memory, random-access memory (RAM), CD-ROMs, magnetic tape, hard disk, and optical data storage device. The communication interfacing unit 420 is preferably a radio transceiver and can exchange wireless signals with a network (i.e. E-UTRAN) according to processing results of the processing means 400.

Figure 5:
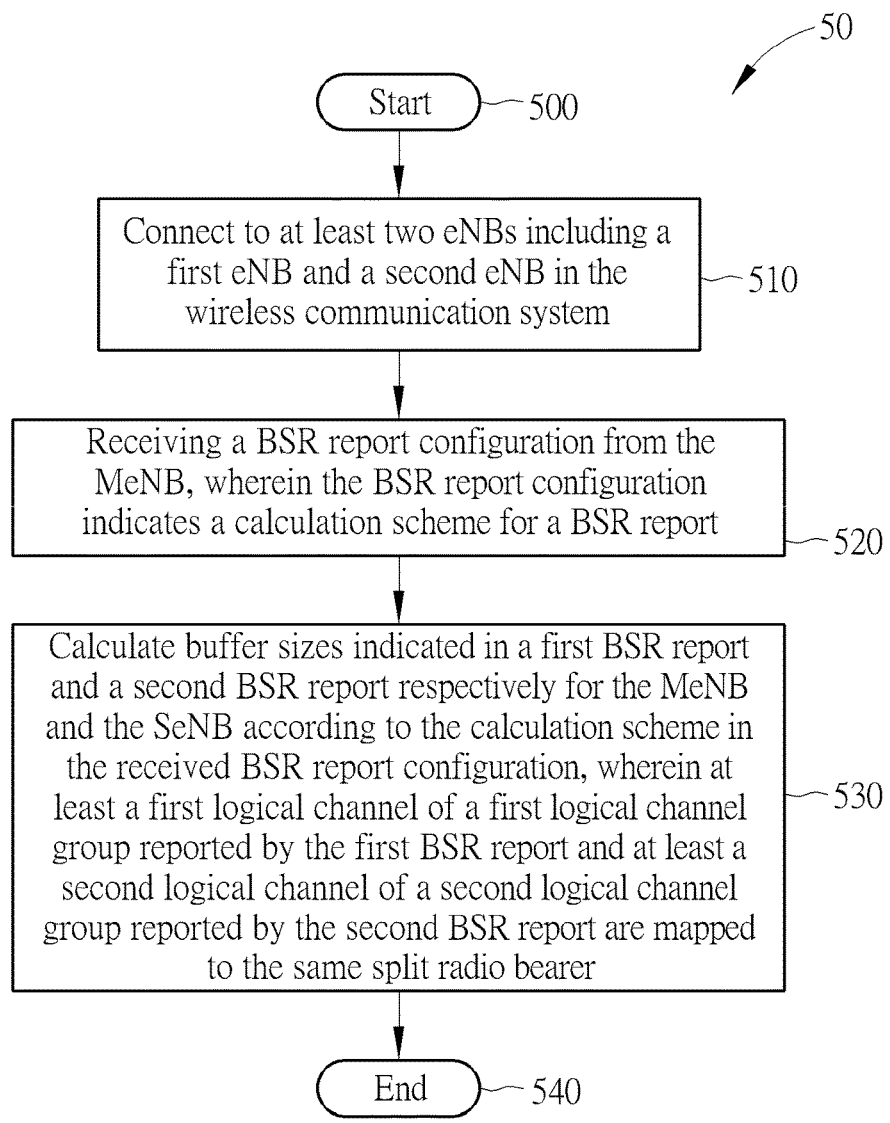
FIG. 5 is a flowchart of an exemplary process according to the present disclosure.

Please refer to FIG. 5, which is a flowchart of a process 50 according to an example of the present disclosure. The process 50 is utilized in the UE of FIG. 3 for BSR reporting in dual connectivity. The process 50 may be compiled into a program code 414 to be stored in the storage unit 410, and may include the following steps:

Step 500: Start.

Step 510: Connect to at least two eNBs including a MeNB and a SeNB in the wireless communication system.

Step 520: Receiving a BSR configuration from the MeNB, wherein the BSR configuration indicates a calculation scheme for a BSR.

Step 530: Calculate buffer sizes indicated in a first BSR for the MeNB and a second BSR for the SeNB according to the calculation scheme in the received BSR configuration, wherein at least a first logical channel of a first logical channel group reported by the first BSR and at least a second logical channel of a second logical channel group reported by the second BSR are mapped to the same split radio bearer.

Step 540: End.

According to the process 50, the UE is configured with at least two eNBs to receive/transmit data from/to the at least two eNBs, wherein the at least two eNBs may be a MeNB and a SeNB. For uplink resource allocation, the UE reports a first BSR to the MeNB and reports a second BSR to the SeNB. The first BSR is used for reporting buffer size of a first logical channel group, and the second BSR is used for reporting buffer size of a second logical channel group. Note that, the buffer sizes of the first and second BSRs are calculated according to the calculation scheme in the received BSR configuration if at least a first logical channel of the first logical channel group and at least a second logical channel of the second logical channel group are mapped to the same split radio bearer.

Note that, the present invention discloses an optimized BSR reporting method to avoid or reduce uplink resource waste. The process 50 is used for a non-split radio bearer (i.e. one radio bearer maps to one logical channel maintained by one MAC entity of the UE) and a split radio bearer (one radio bearer maps to at least two logical channels maintained by at least two corresponding MAC entities of the UE).

Figure 6:
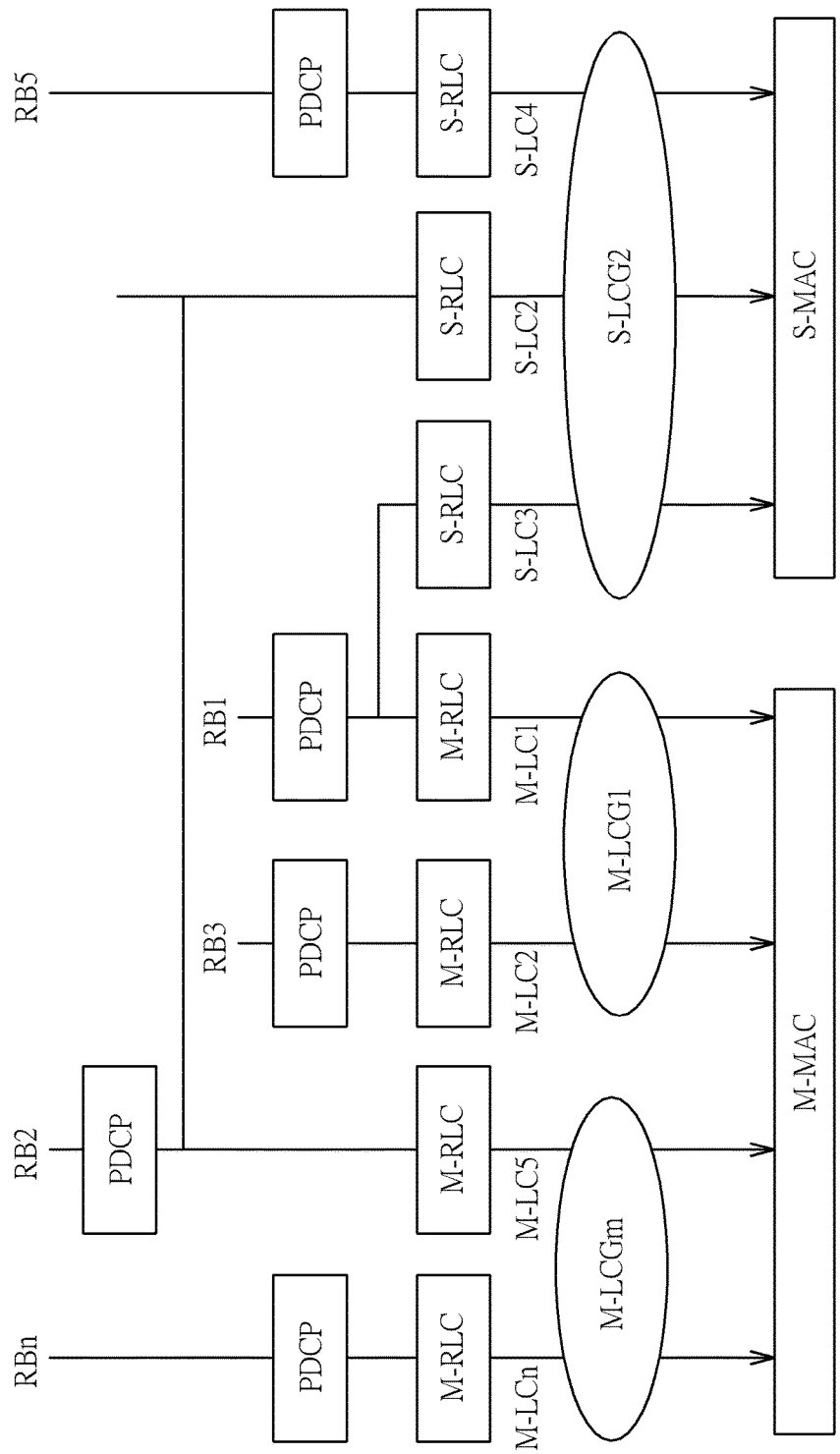
FIG. 6 illustrates a schematic diagram of a user equipment for BSR reporting according to the present invention.

In detail, please refer to FIG. 6, which illustrates a schematic diagram of a UE connecting to a MeNB and a SeNB with non-split radio bearers and split radio bearers according to the present invention. As shown in FIG. 6, the UE reports first BSR BSR_MeNB for logical channel groups M-LCG1 and M-LCGm maintained in MAC entity M-MAC related to the MeNB, and reports the second BSR report BSR_SeNB for logical channel group S-LCG2 maintained in MAC entity S-MAC related to the SeNB, wherein the logical channel M-LC1 of the logical channel group M-LCG1 and the logical channel S-LC3 of the logical channel group S-LCG2 are mapped to the same split radio bearer RB1, and the logical channel S-LC2 of the logical channel group S-LCG2 and logical channel M-LC5 of the logical channel group M-LCGm are mapped to the same spilt radio bearer RB2.

For BSR calculation which split radio bearer(s) are involved in, there may be several calculation schemes. In the first calculation scheme, buffer size of a BSR for a logical channel group is the sum of the total data amount in PDCP buffer (s) of the corresponding radio bearer(s) belonging to the logical channel group and the total data amount in RLC buffer(s) of the corresponding logical channel(s) in the logical channel group. For example, in FIG. 6, with the first calculation scheme, the buffer size of the first BSR BSR_MeNB and the second BSR BSR_SeNB are calculated according to the following equations:

BSR_MeNB (for M-LCG1)=PDCP buffer size of RB1+PDCP buffer size of RB3+RLC buffer size of M-LC1+RLC buffer size of M-LC2; and BSR_SeNB (for S-LCG2)=PDCP buffer size of RB1+PDCP buffer size of RB2+PDCP buffer size of RB5+RLC buffer size of S-LC2+RLC buffer size of S-LC3+RLC buffer size of S-LC4.

For simplicity, in the following example, a single split radio bearer in a logical channel group is illustrated. However, the logical channel group should not limit to one split radio bearer but may include non-split radio bearer. In addition, data amount is used for BSR in the following example instead of index of a buffer size table.

Figure 7:
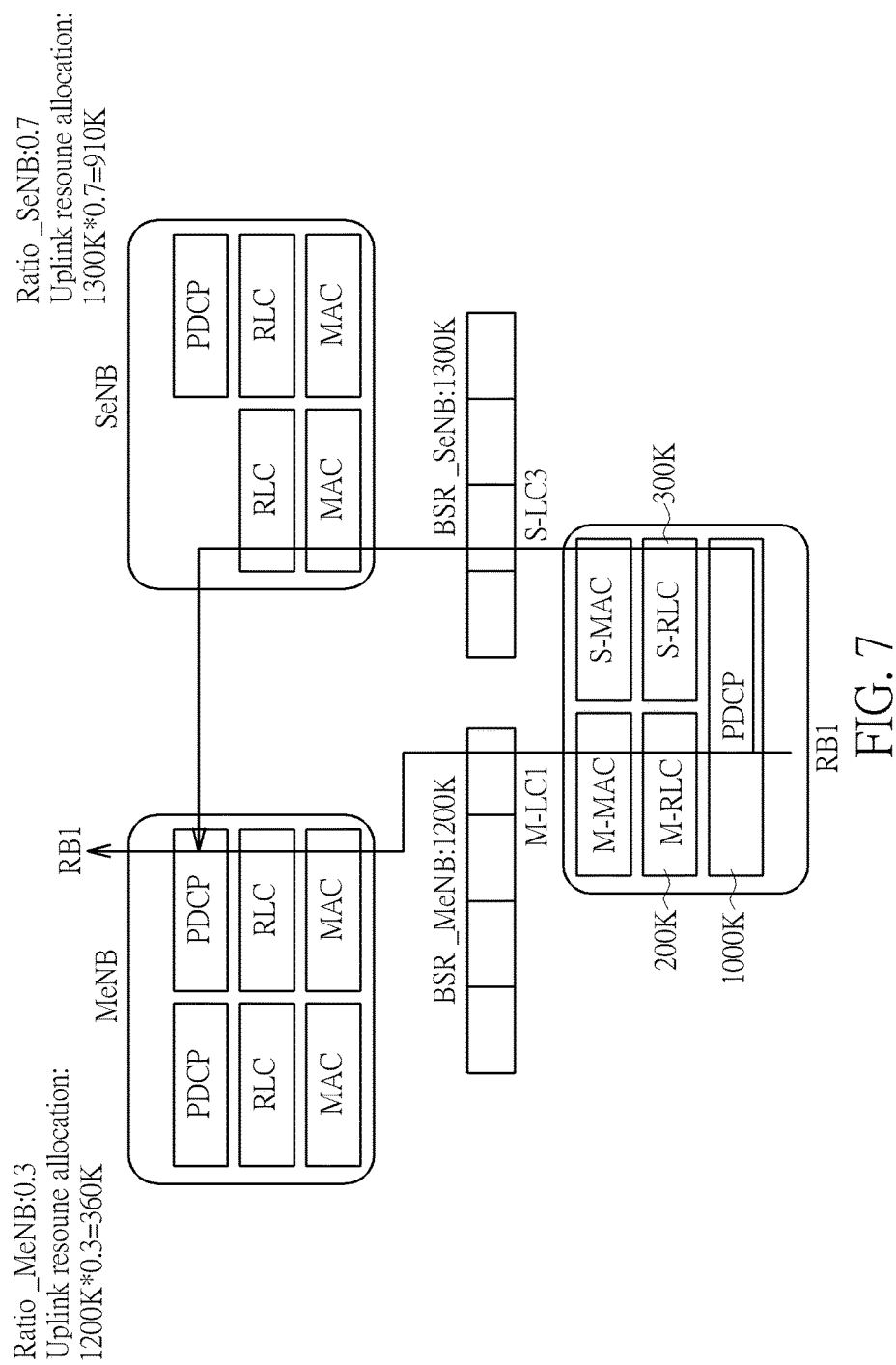
FIGS. 7-9 illustrate schematic diagrams of several exemplary embodiments.

Please refer to FIG. 7, which illustrate a schematic diagram of a BSR for a split radio bearer (i.e. the radio bearer RB1 shown in FIG. 6) according to the present invention. Assume data size in the PDCP buffer for the split radio bearer RB1 is 1000 k bytes, in the RLC buffer M-RLC for the logical channel M-LC1 served by the MAC entity M-MAC is 200 k bytes, and in the RLC buffer S-RLC for the logical channel S-LC3 served by the MAC entity S-MAC is 300 k bytes. By applying the first calculation scheme, buffer size indicated by the first BSR BSR_MeNB is 1200 k bytes and the second BSR BSR_SeNB is 1300 k bytes. Specifically, the BSR reports for the MeNB and SeNB are calculated by the equations:

BSR_MeNB=PDCP buffer size of RB1+M-RLC buffer size of M-LC1=1000+200 k bytes; and BSR_SeNB=PDCP buffer size of RB1+S-RLC buffer size of S-LC3=1000+300 k bytes.

By applying the first calculation scheme, when the UE reports the BSRs to the MeNB and SeNB respectively, the MeNB and SeNB are coordinated for uplink resource allocation according to the BSRs. Note that, the MeNB and SeNB may perform the coordination before or after receiving the BSRs. The coordination between the MeNB and SeNB may include exchanging information, such as how much ratio of uplink data the MeNB and SeNB are in charge of (represented as ratio_MeNB and ratio_SeNB hereafter), amount uplink data per time unit for the MeNB and SeNB (represented as UL_data_rate_MeNB and UL_data_rate_SeNB hereafter), the mapping information of radio bearers and LCs and LCGs, backhaul latency, loading of MeNB and SeNB, and number of UEs in the MeNB and SeNB.

Based on the coordination between the MeNB and SeNB, the MeNB and SeNB know how much uplink resource should be allocated to the UE when receiving the BSRs from the UE. For example, the MeNB may allocate the uplink resource equal to ratio_MeNB×buffer size indicated in the first BSR BSR_MeNB to the UE. Similarly, the SeNB may allocate the uplink resource equal to ratio_MeNB×buffer size indicated in the second BSR BSR_SeNB to the UE. In other example, the MeNB may allocate the uplink resource of UL_data_rate_MeNB×period_of_time to the UE. Similarly, the SeNB may allocate the uplink resource of UL_data_rate_SeNB×period_of_time to the UE. Note that, the ratio or uplink data per time unit for the MeNB and SeNB could be predetermined or coordinated between the MeNB and SeNB based on the exchanging information and the received BSR(s).

Please refer back to FIG. 7. Assume the ratio_MeNB and ratio_SeNB is 0.3 and 0.7. The MeNB and SeNB should allocate 30% and 70% uplink resource for the UE when receiving the corresponding BSRs. In this example, the MeNB allocates 360 k bytes (1200 k×0.3) to the UE after receiving the first BSR BSR_MeNB, and the SeNB allocates 910 k bytes (1300 k×0.7) to the UE after receiving the second BSR BSR_SeNB.

In the second calculation scheme, the PDCP buffer size of the split radio bearer and the RLC buffer sizes of the corresponding logic channels of the split radio bearer are all calculated for BSR. Specifically, by applying the second calculation scheme, buffer size of a BSR for a logical channel group is the sum of the total data amount in PDCP buffer(s) of the radio bearer(s) belonging to the logical channel group, the total data amount in RLC buffer(s) of the corresponding logical channels in the logical channel group and the total data amount in other RLC buffer(s) which belongs to the split radio bearer(s) among the radio bearer(s) belonging to the logical channel group. For example, in FIG. 6, with the second calculation scheme, the buffer size of the first BSR BSR_MeNB and the second BSR BSR_SeNB are calculated according to the following equations:

BSR_MeNB (for M-LCG1)=PDCP buffer size of RB1+PDCP buffer size of RB3+RLC buffer size of M-LC1+RLC buffer size of M-LC2+ RLC buffer size of S-LC3; and BSR_SeNB (for S-LCG2)=PDCP buffer size of RB1+PDCP buffer size of RB2+PDCP buffer size of RB5+RLC buffer size of S-LC2+RLC buffer size of S-LC3+RLC buffer size of S-LC4+RLC buffer size of M-LC1+RLC buffer size of M-LC5.

Figure 8:
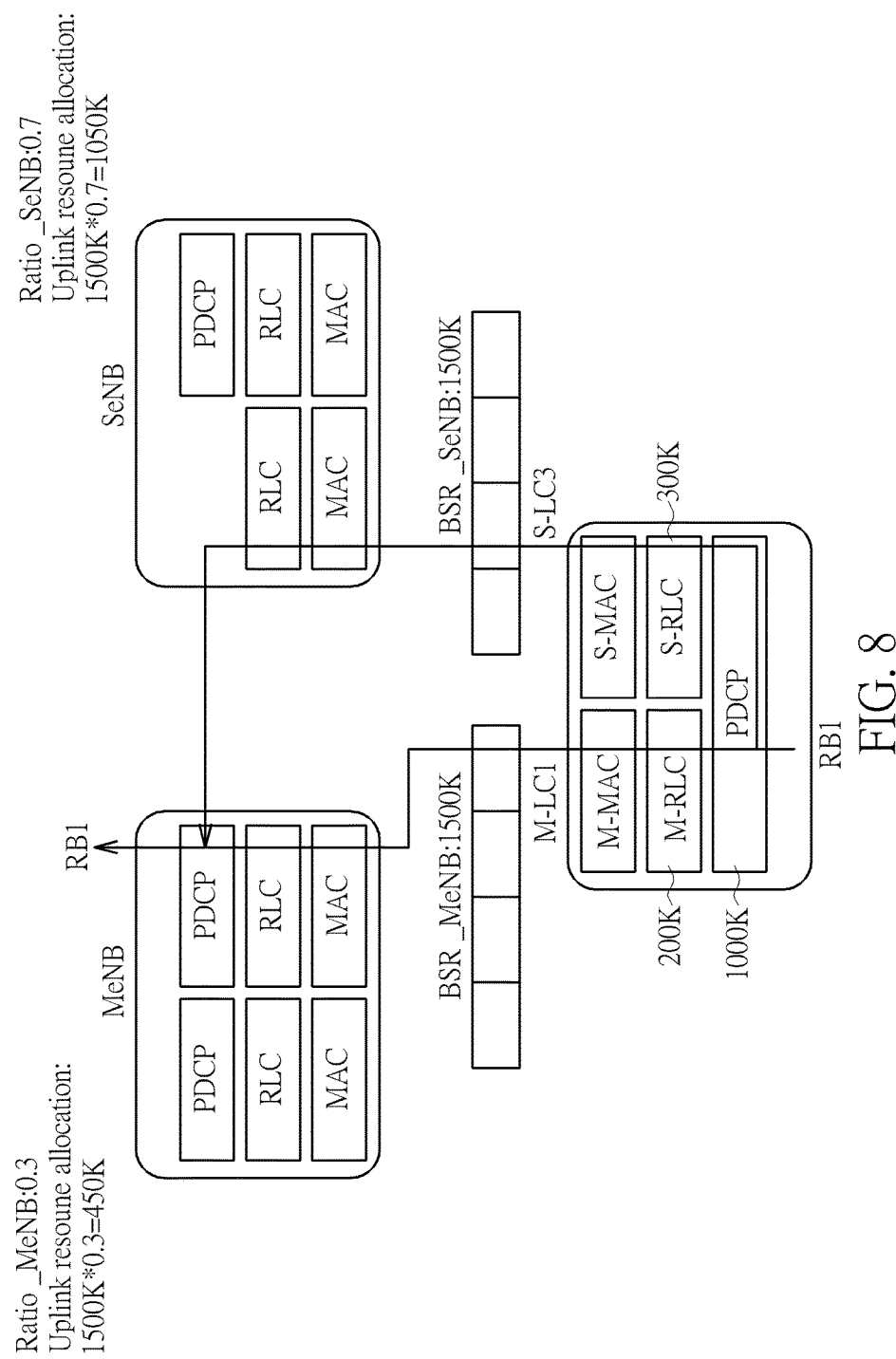

In detail, please refer to FIG. 8, which illustrates a schematic diagram of a BSR for a split radio bearer (i.e. the radio bearer RB1 shown in FIG. 6) according to the present invention. Assume data size in the PDCP buffer for the split radio bearer RB1 is 1000 k bytes, in the RLC buffer M-RLC for logical channel M-LC1 served by the MAC entity M-MAC is 200 k bytes, and in the RLC buffer S-RLC for logical channel S-LC3 served by the MAC entity S-MAC is 300 k bytes. Buffer size indicated by the first BSR BSR_MeNB is 1500 k bytes and the second BSR BSR_SeNB is 1500 k bytes. The BSRs for the MeNB and SeNB can be represented by the equation:

BSR_MeNB=PDCP buffer size of RB1+M-RLC buffer size of M-LC1+S-RLC buffer size of S-LC3=1000+200+300 k bytes; and BSR_SeNB=PDCP buffer size of RB1+S-RLC buffer size of S-LC3+M-RLC buffer size of M-LC1=1000+300+200 k bytes.

In addition, after coordination between the MeNB and SeNB, the MeNB and SeNB determines that the ratio_MeNB and ratio_SeNB is 0.3 and 0.7 (namely the MeNB and SeNB may allocate about 30% and 70% uplink resource for the UE when receiving the corresponding BSRs). In this example, the MeNB may allocate 450 k bytes (1500 k×0.3) to the UE after receiving the first BSR BSR_MeNB, and the SeNB may allocate 1050 k bytes (1500 k×0.7) to the UE after receiving the second BSR BSR_SeNB.

In the third calculation scheme, in a BSR for a logical channel group, total data amount in PDCP buffer(s) of the radio bearer(s) belonging to the logical channel group and total data amount in RLC buffer(s) of the corresponding logical channel(s) in the logical channel group are reported separately. For example, in FIG. 6, with the third calculation scheme, the first BSR BSR_MeNB would have two values, one to indicate the data size in PDCP buffers and the other to indicate the data size in M-RLC buffers. Similarly, the second BSR BSR_SeNB would have two values, one (PDCP part) to indicate the data size in PDCP buffers and the other (RLC part) to indicate the data size in S-RLC buffers. With the third calculation scheme, the buffer sizes of the first BSR BSR_MeNB and the second BSR BSR_SeNB are calculated according to the following equations:

BSR_MeNB (for M-LCG1 for PDCP part)=PDCP buffer size of RB1+PDCP buffer size of RB3;

BSR_MeNB (for M-LCG1 for RLC part)=RLC buffer size of M-LC1+RLC buffer size of M-LC2;

BSR_SeNB (for S-LCG2 for PDCP part)=PDCP buffer size of RB1+PDCP buffer size of RB2+ PDCP buffer size of RB5; and BSR_SeNB (for S-LCG2 for RLC part)=RLC buffer size of S-LC2+RLC buffer size of S-LC3+RLC buffer size of S-LC4.

Figure 9:
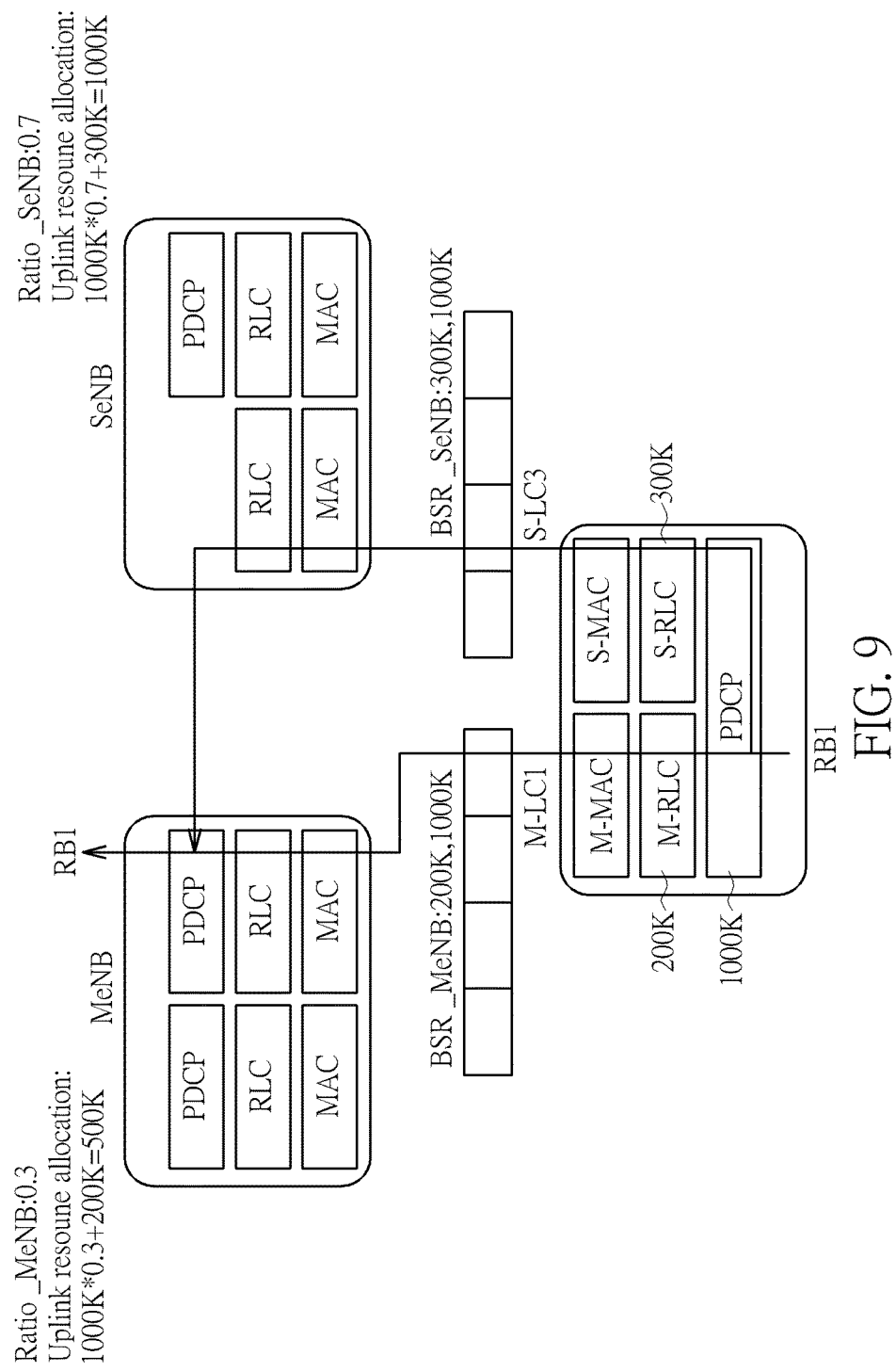

In detail, please refer to FIG. 9, which illustrates a schematic diagram of a BSR for a split radio bearer (i.e. the radio bearer RB1 shown in FIG. 6) according to the present invention. Assume data size in the PDCP buffer for RB1 is 1000 k bytes, in the RLC buffer M-RLC for logical channel M-LC1 served by the MAC entity M-MAC is 200 k bytes, and in the RLC buffer S-RLC for logical channel S-LC3 served by the MAC entity S-MAC is 300 k bytes. The first BSR BSR_MeNB includes information of 1000 k bytes in PDCP buffer and 200 k bytes in RLC buffer. The second BSR BSR_SeNB includes information of 1000 k bytes in PDCP buffer and 300 k bytes in RLC buffer.

In addition, after coordination between the MeNB and SeNB, the MeNB and SeNB determines that the ratio_MeNB and ratio_SeNB is 0.3 and 0.7 (namely the MeNB and SeNB allocate 30% and 70% uplink resource for the UE when receiving the corresponding BSR s). In this example, the MeNB may allocate 500 k bytes (1000 k×0.3+200 k) to the UE after receiving the first BSR BSR_MeNB, and the SeNB may allocate 1000 k bytes (1000 k×0.7+300 k) to the UE after receiving the second BSR BSR_SeNB.

Note that, in this disclosure, the number of SeNBs may not be limited to one. In addition, calculation schemes are not limited herein, and any combination of the abovementioned calculation schemes should be involved in the scope of the present invention.

Figure 10:
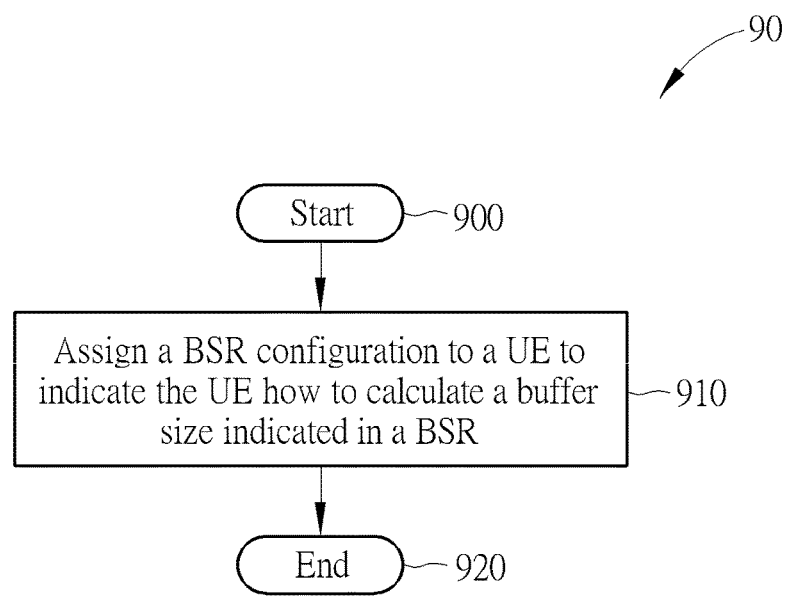
FIG. 10 is a flowchart of an exemplary process according to the present disclosure.

Please refer to FIG. 10, which is a flowchart of a process 90 according to an example of the present disclosure. The process 90 is utilized in the MeNB of FIG. 3 for BSR reporting in dual connectivity. The process 90 may be compiled into a program code 414 to be stored in the storage unit 410, and may include the following steps:

Step 900: Start.

Step 910: Assign a BSR configuration to a UE to indicate the UE how to calculate a buffer size indicated in a BSR.

Step 920: End.

According to the process 90, the MeNB sends the BSR configuration to the UE to indicate the UE how to report BSRs to the MeNB and the SeNB, wherein the BSR configuration may be determined by coordination between the MeNB and the SeNB according to the BSRs received from the UE.

The BSR configuration may include a ratio parameter for indicating how much ratio of uplink data in the PDCP buffer for a split radio bearer should be counted in the corresponding BSR which is sent to MeNB or SeNB, an indicator for indicating to which eNB (i.e. MeNB, SeNB, MeNB ID, or SeNB ID) the MeNB wants the UE to transmit uplink data of radio bearer, and loading information of MeNB and SeNB. Based on the loading information, the UE may decide how much ratio of uplink data in the PDCP buffer for the split radio bearer should be counted in the corresponding BSR which is sent to MeNB or SeNB. Alternatively, based on the loading information and a mapping table, the UE may decide how much of uplink data in PDCP buffer for the split radio bearer should be counted in the corresponding BSR which is sent to the MeNB or SeNB. The mapping table indicates the ratio or data amount for calculating BSR, and could be configured by the MeNB or predetermined.

Figure 11:
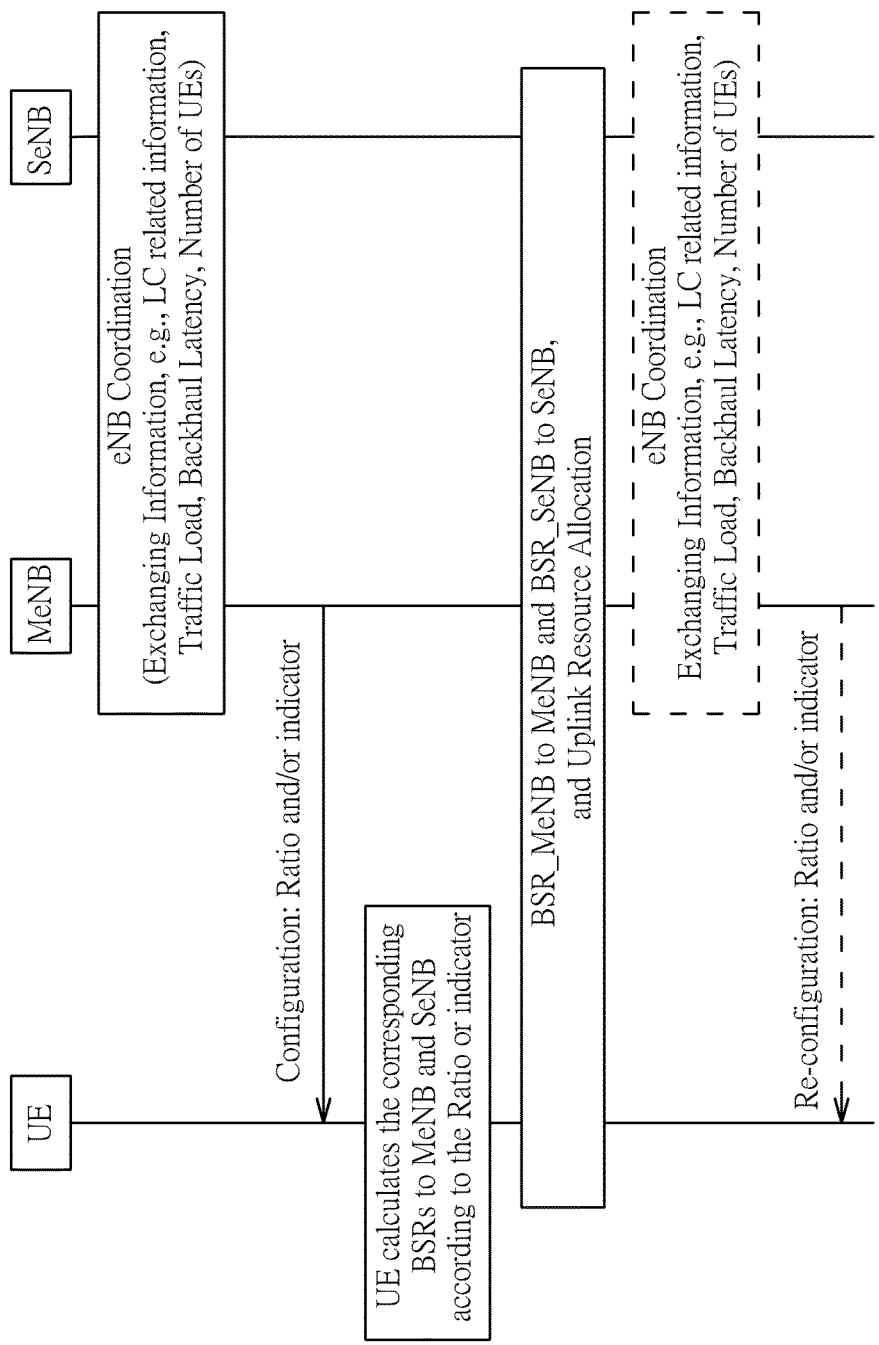

Please refer to FIG. 11, which is a message sequence chart for BSR reporting according to the present invention. In FIG. 11, if necessary, the MeNB and SeNB coordinates for uplink resource allocation and exchange information such as logical channel related information, traffic load, backhaul latency, and number of UEs for the MeNB to determine a ratio of the configuration for a UE, which is to indicate how much ratio of uplink data in PDCP buffer for the split radio bearer should be counted in the corresponding BSRs for the MeNB and SeNB. If the MeNB wants the UE only transmitting uplink data of a radio bearer to one of SeNB or MeNB, the configuration may include an indicator to indicate the eNB to allocate the UL resource for uplink data transmission. This indicator means that the corresponding ratio for PDCP buffer of the eNB is set to 1 and the corresponding ratio for PDCP buffer of the other eNB is set to 0. For example, the indicator may indicate the UE to send PDCP data of a radio bearer to MeNB only. Note that, the configuration is generated by MeNB and MeNB may transmit this configuration to the UE, or the MeNB may transmit this configuration via the SeNB to the UE. In an embodiment, the MeNB may determine a general ratio for all UEs. Alternatively, the MeNB may transmit the configuration with different ratios to different UEs depends on the UE categories, UE priorities, UE behavior, UE mobility states, or predefined rules and policies.

Moreover, after receiving the configuration, the UE calculates the corresponding BSRs to the MeNB and SeNB according to the ratio of configuration when the UE needs to transmit BSRs. After receiving the corresponding BSR, the MeNB and SeNB perform uplink resource allocation accordingly. In an embodiment, the MeNB and SeNB may coordinate for uplink resource allocation periodically or by event-triggered (for example, the UL traffic load of an eNB becomes heavy and may exceed a pre-defined threshold). In addition, the MeNB may transmit the configuration with new configuration to the UE in any time.

Figure 12:
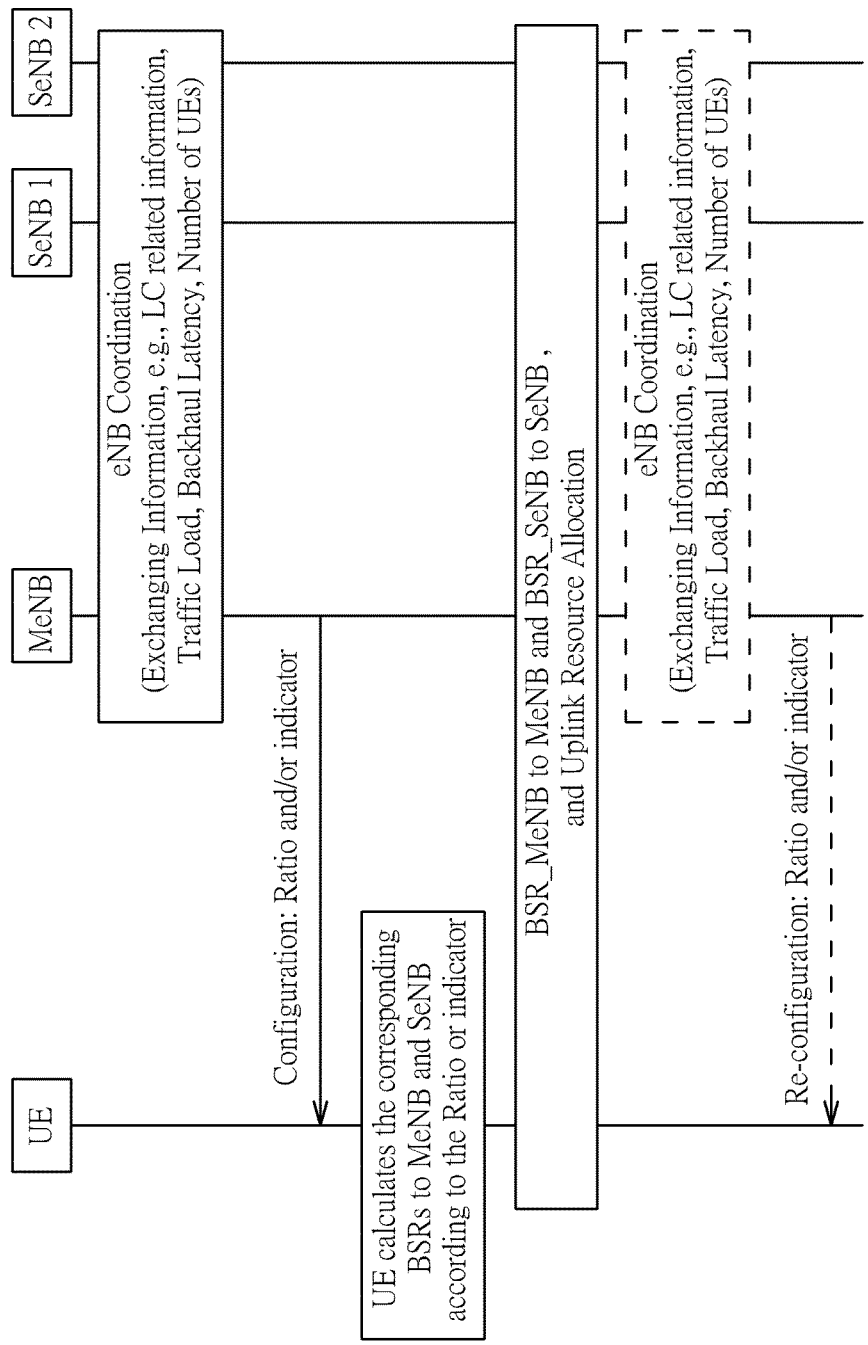

Please refer to FIG. 12, which is a message sequence chart for BSR reporting according to the present invention. The difference between the FIGS. 11 and 12 is that the number of SeNBs may not be limited to one. In FIG. 12, the operation of BSR may apply for a UE connecting to a MeNB and a plurality of SeNBs.

Figure 13:
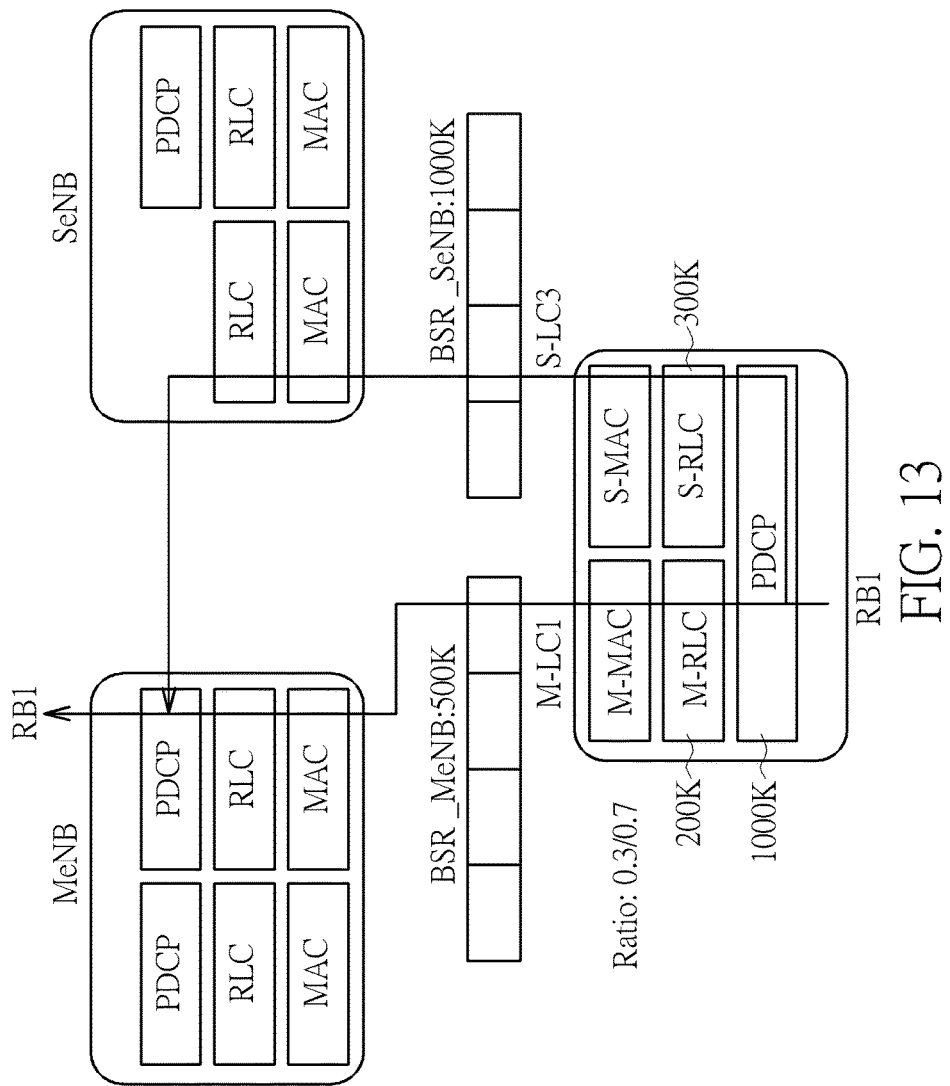

As to BSR reporting, please refer to FIG. 13, which illustrates a schematic diagram of a BSR for a split radio bearer according a first embodiment. As shown in FIG. 13, the UE receives the configuration including a ratio for the MeNB is 0.3 and a ratio for the SeNB is 0.7. Assume data size in the PDCP buffer of the radio bearer RB1 of the UE is 1000 k bytes, in the RLC buffer M-RLC of the logical channel M-LC1 served by the MAC entity M-MAC is 200 k bytes, and in the RLC buffer S-RLC of the logical channel S-LC3 served by MAC entity S-MAC is 300 k bytes. In this embodiment, buffer size indicated by the first BSR BSR_MeNB is 500 k bytes (1000 k×0.3+200 k) and the second BSR BSR_SeNB is 1000 k bytes (1000 k×0.7+300 k). After the MeNB and SeNB receive the first and second BSRts BSR_MeNB and BSR_SeNB from the UE, the MeNB and the SeNB allocate uplink resource to the UE according to the received BSRs. In this embodiment, the MeNB may allocate 500 k bytes and the SeNB may allocate 1000 k bytes to the UE.

Figure 14:
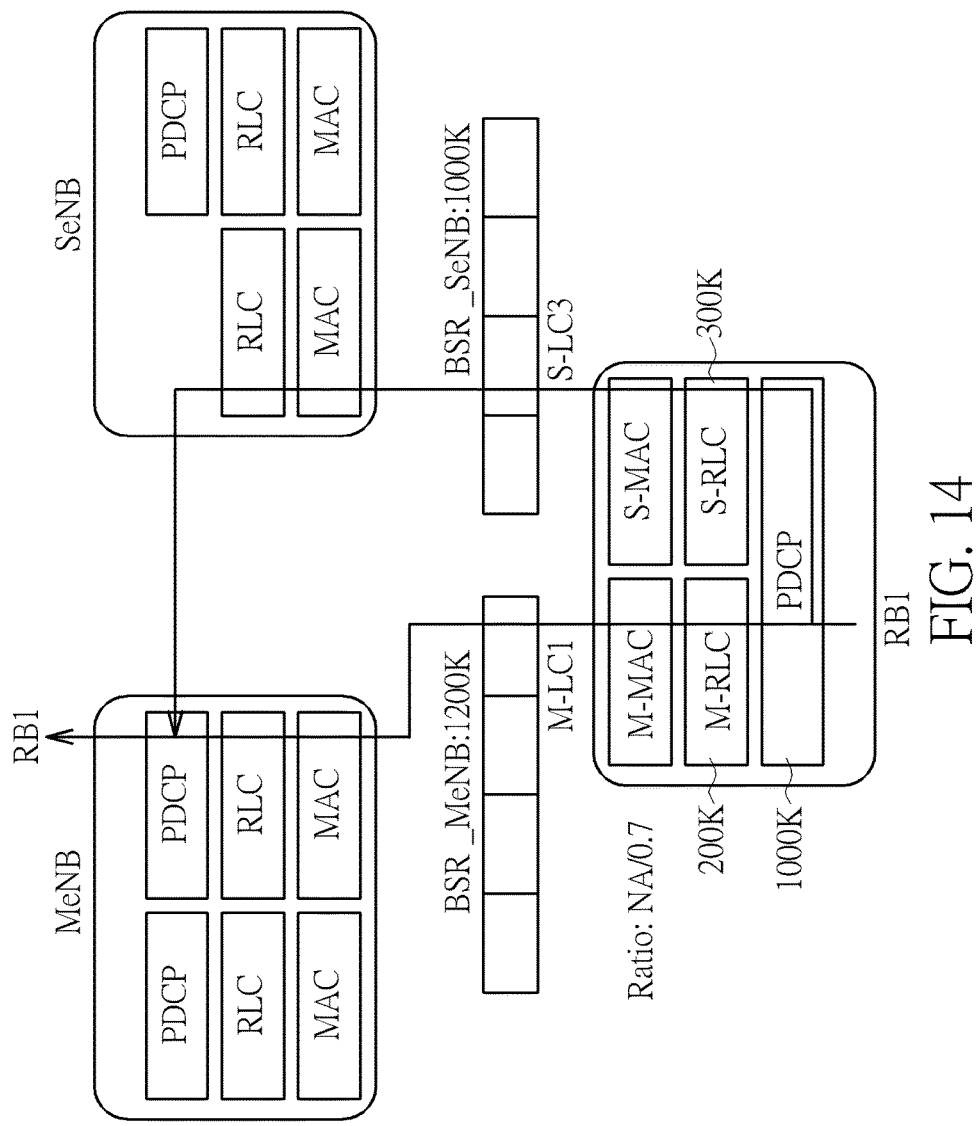

Please refer to FIG. 14, which illustrates a schematic diagram of a BSR for a split radio bearer according a second embodiment. As shown in FIG. 14, the UE receives the configuration including a ratio for the MeNB is NA (namely the ratio related to the MeNB might not be considered) and a ratio for the SeNB is 0.7. Assume data size in the PDCP buffer of the radio bearer RB1 is 1000 k bytes, in the RLC buffer M-RLC of the logical channel M-LC1 served by the MAC entity M-MAC is 200 k bytes, and in the RLC buffer S-RLC of the logical channel S-LC3 served by the MAC entity S-MAC is 300 k bytes. In this embodiment, buffer size indicated by the first BSR BSR_MeNB is 1200 k bytes (1000 k+200 k) and the second BSR BSR_SeNB is 1000 k bytes (1000 k×0.7+300 k). After the MeNB and SeNB receive the first and second BSRs BSR_MeNB and BSR_SeNB from the UE, the MeNB and the SeNB allocate uplink resource to the UE according to the received BSRs. In this embodiment, the MeNB may allocate 1200 k bytes and the SeNB may allocate 1000 k bytes to the UE.

Figure 15:
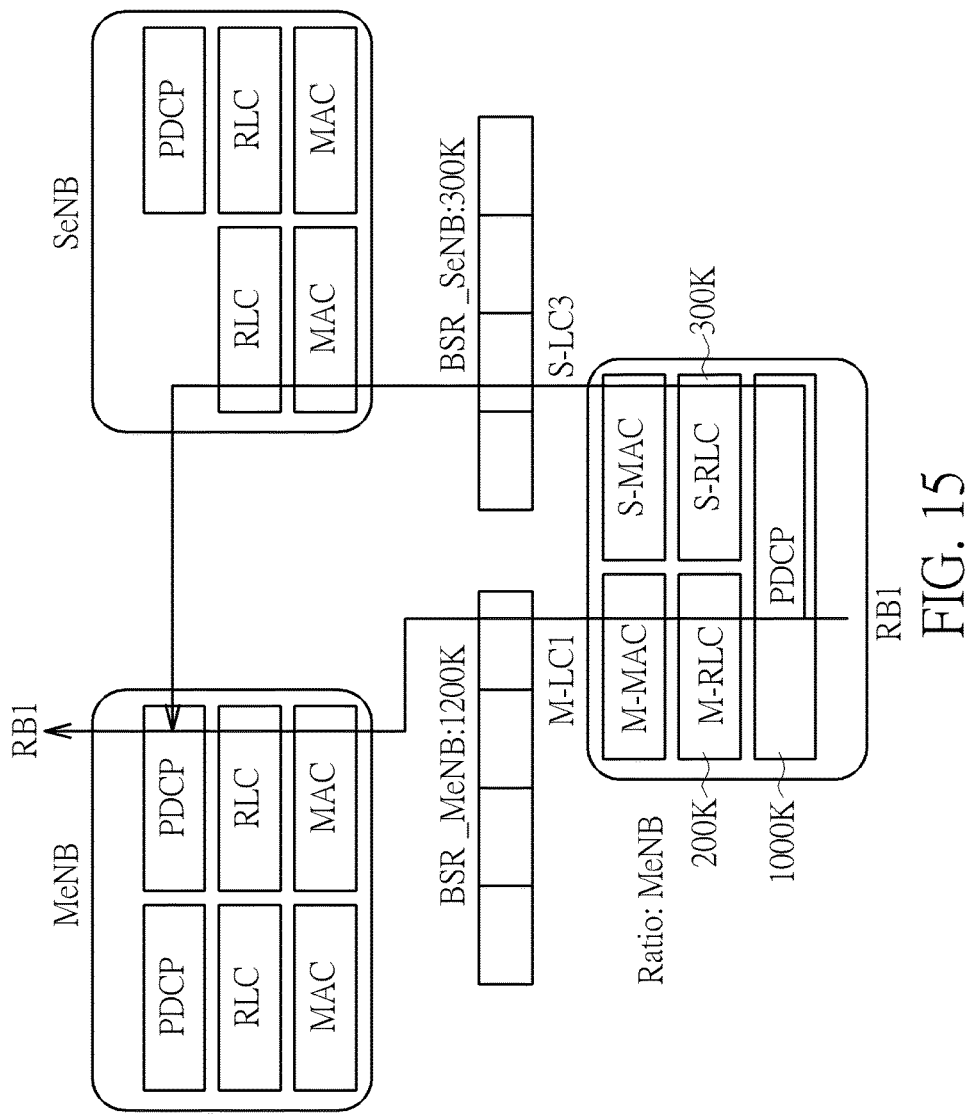

Please refer to FIG. 15, which illustrates a schematic diagram of a BSR for a split radio bearer according a third embodiment. As shown in FIG. 15, the UE receives the configuration including an indicator indicating which eNB to allocate UL resource for data in PDCP buffer. If the indicator indicating to MeNB, it means the ratio for the MeNB is 1 and the ratio for the SeNB is 0. If the indicator indicating to SeNB, it means the ratio for the MeNB is 0 and the ratio for the SeNB is 1. Assume data size in the PDCP buffer of the radio bearer RB1 is 1000 k bytes, in the RLC buffer M-RLC of the logical channel M-LC1 served by the MAC entity M-MAC is 200 k bytes, and in the RLC buffer S-RLC of the logical channel S-LC3 served by the MAC entity S-MAC is 300 k bytes. In this embodiment, buffer size indicated by the first BSR BSR_MeNB is 1200 k bytes (1000 k+200 k) and the second BSR BSR_SeNB is 300 k bytes (300 k). After the MeNB and SeNB receive the first and second BSRs BSR_MeNB and BSR_SeNB from the UE, the MeNB and the SeNB allocate uplink resource to the UE according to the received BSRs. In this embodiment, the MeNB may allocate 1200 k bytes and the SeNB may allocate 300 k bytes to the UE.

Alternatively, the BSR configuration may not include ratio parameter but loading information of MeNB and SeNB. Please refer to FIG. 16, which is a message sequence chart for BSR reporting according to the present invention. In this embodiment, the MeNB and SeNB may coordinate for uplink resource allocation and exchange information such as logical channel related information, traffic load, backhaul latency, and number of UEs for the MeNB to determine the loading information for a UE. The loading information indicates the condition of an eNB and a UE is suggested to ask for more uplink resource from the eNB with light load. The configuration including the loading information may generate by the MeNB and MeNB may transmit this configuration to the UE, or the MeNB may transmit this configuration via SeNB to UE alternatively. After receiving the configuration including the loading information from the MeNB, the UE shall calculate the corresponding BSRs to MeNB and SeNB according to the loading information when the UE needs to transmit BSRs. After receiving the corresponding BSRs, the MeNB and SeNB perform uplink resource allocation accordingly. In the meantime, the MeNB and SeNB may coordinate for uplink resource allocation periodically or by event-triggered (for example, the UL traffic load of an eNB becomes heavy and may exceed a pre-defined threshold). The MeNB may transmit the configuration with new loading information to a UE in any time. Note that, the MeNB may provide general loading information for all the UEs. Alternatively, the MeNB may transmit the configuration with different loading information to different UEs depends on the UE categories, UE priorities, UE behavior, UE mobility states, or predefined rules and policies.

Figure 16:
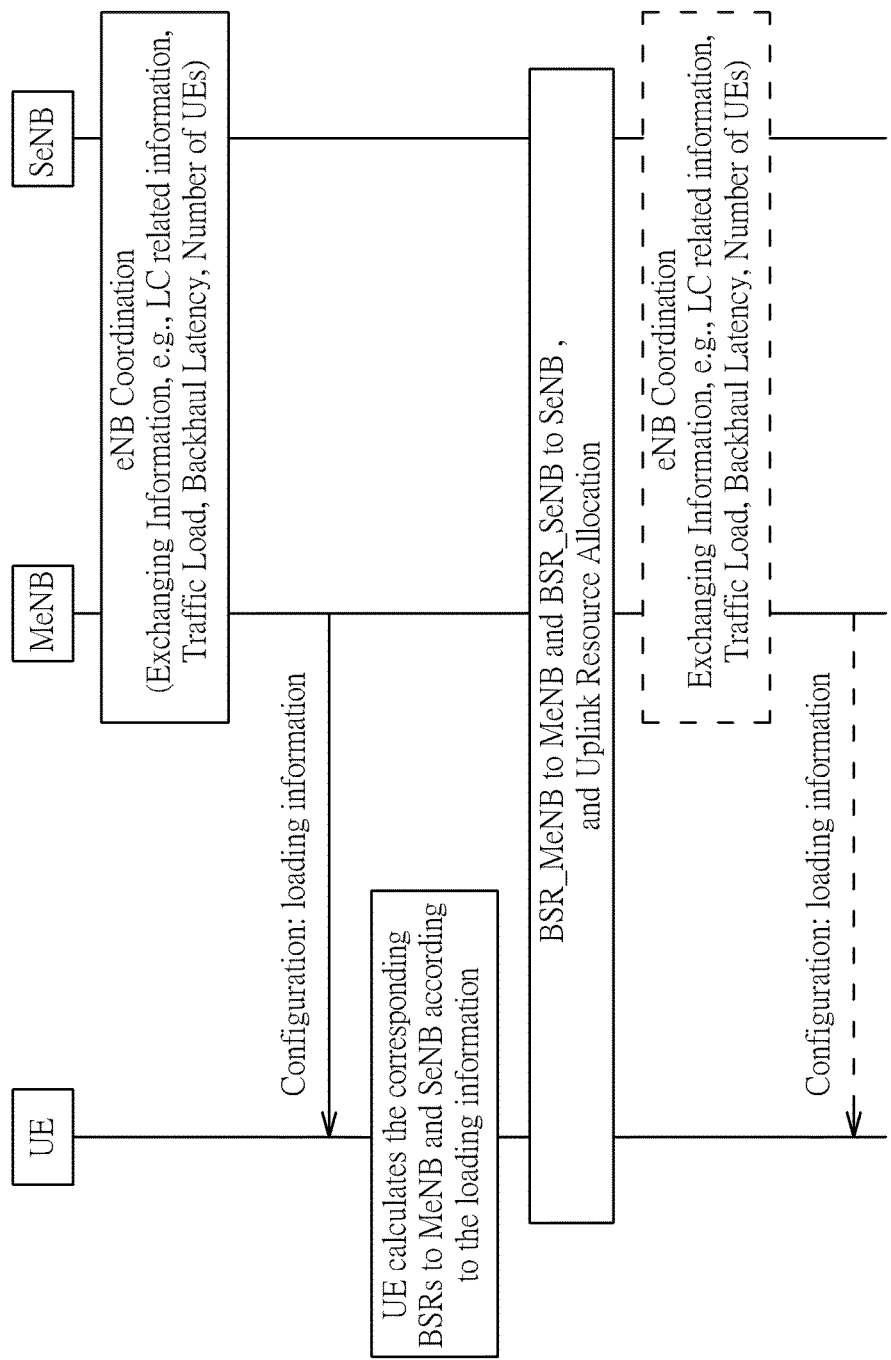
Figure 17:
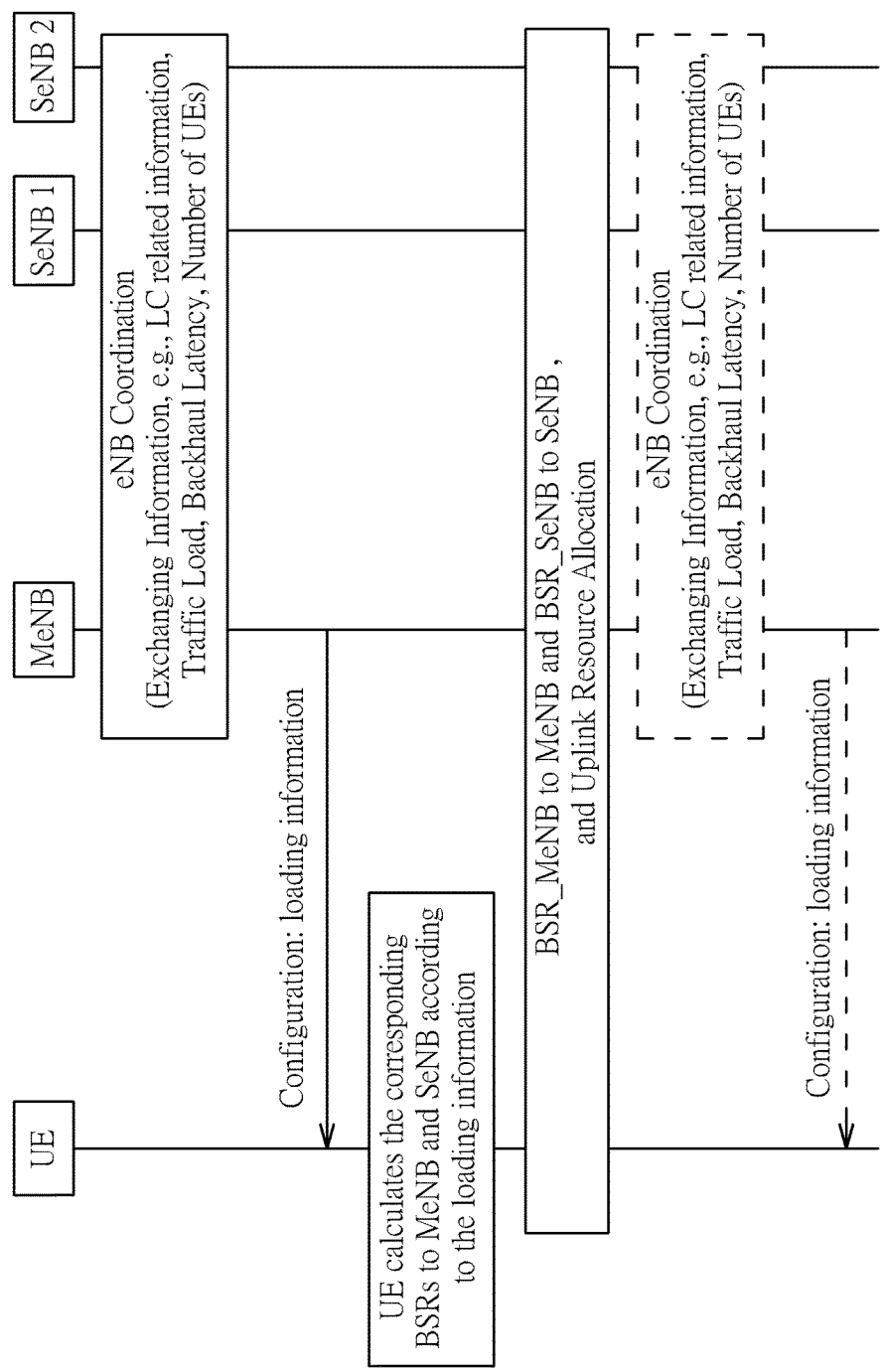
Figure 18:
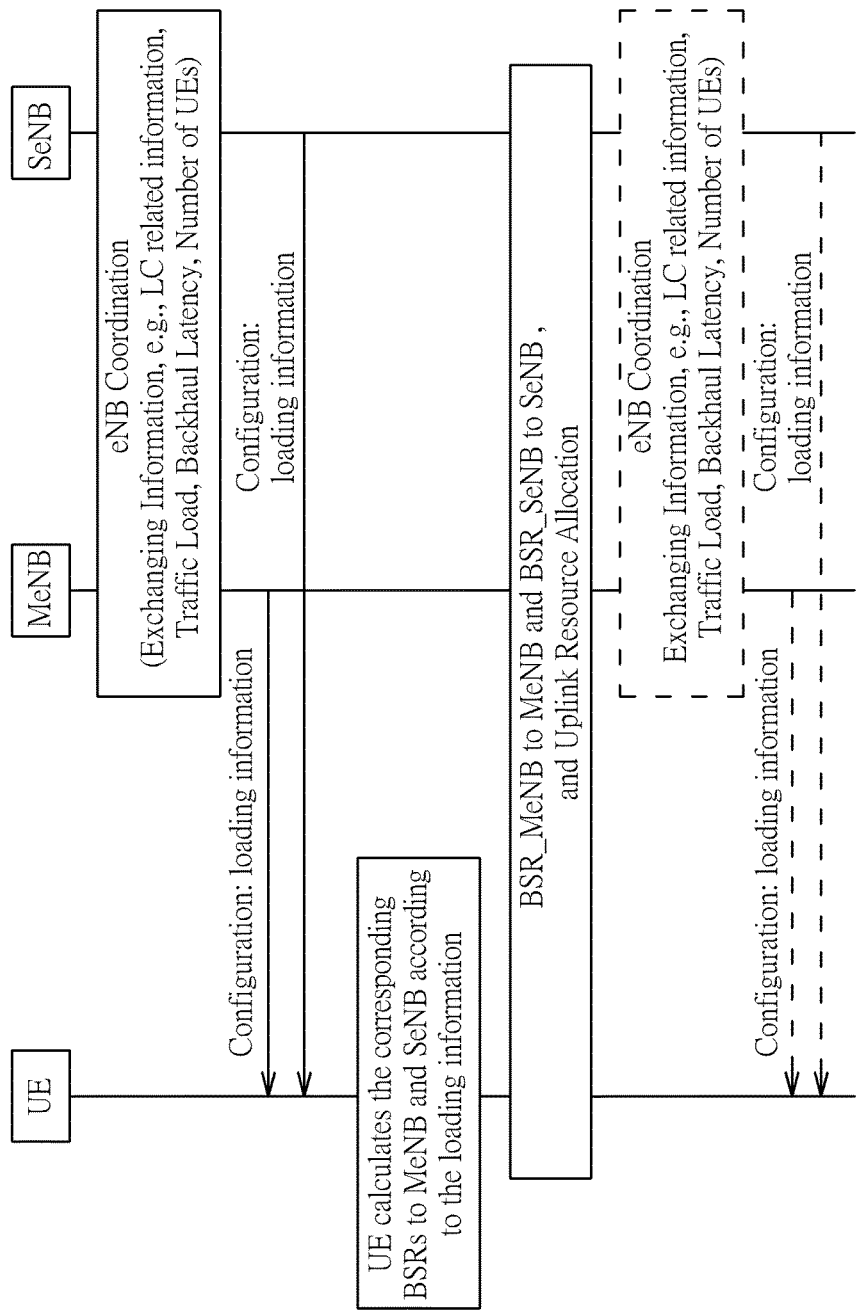
Figure 19:
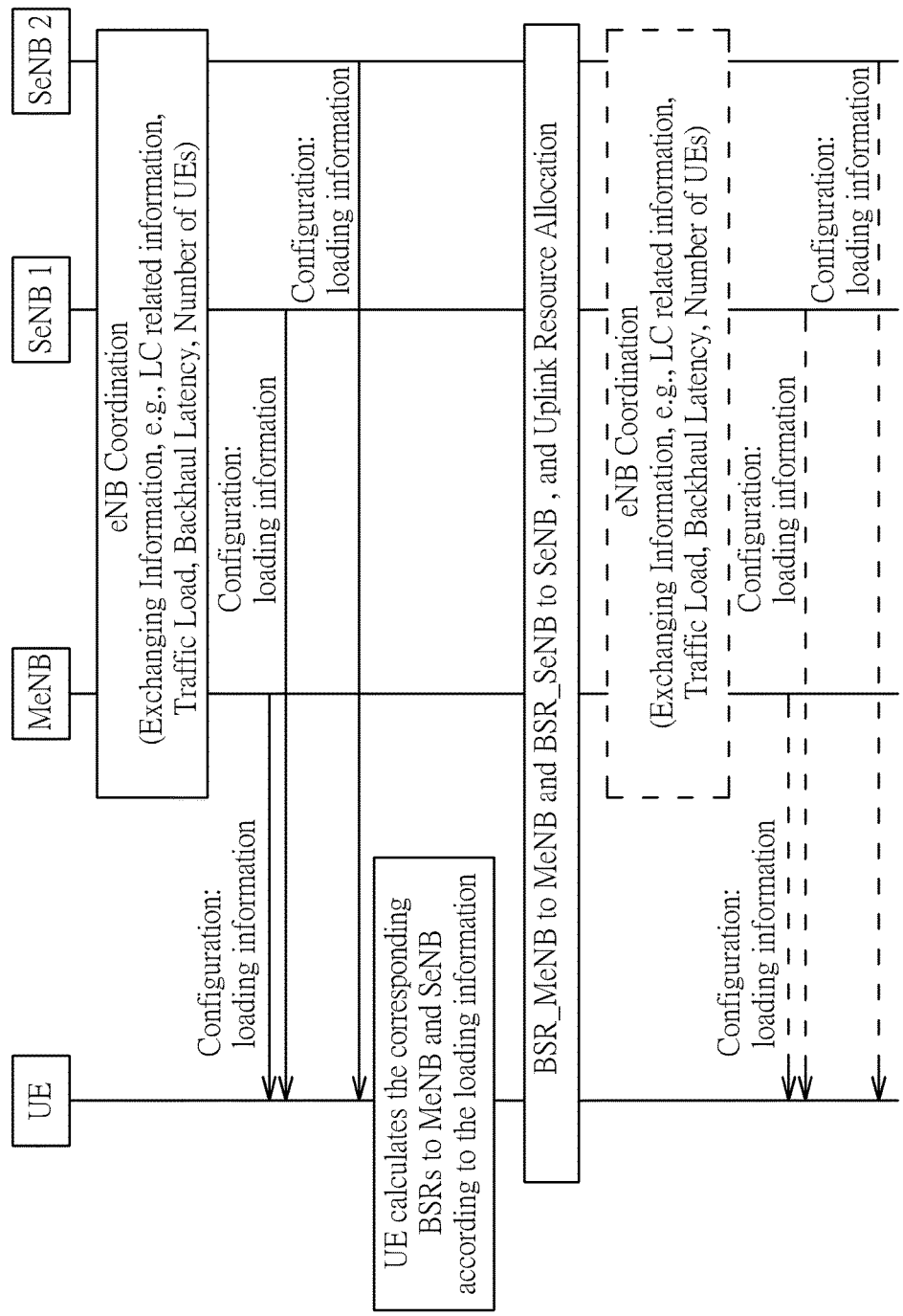

Note that, please refer to FIG. 17, the abovementioned BSR reporting method can be applied to multiple SeNBs instead of one SeNB shown in FIG. 16. In addition, as shown in FIG. 18-19, the configuration including loading information may be transmitted from not only the MeNB but also the SeNBs to the UE.

Figure 21:
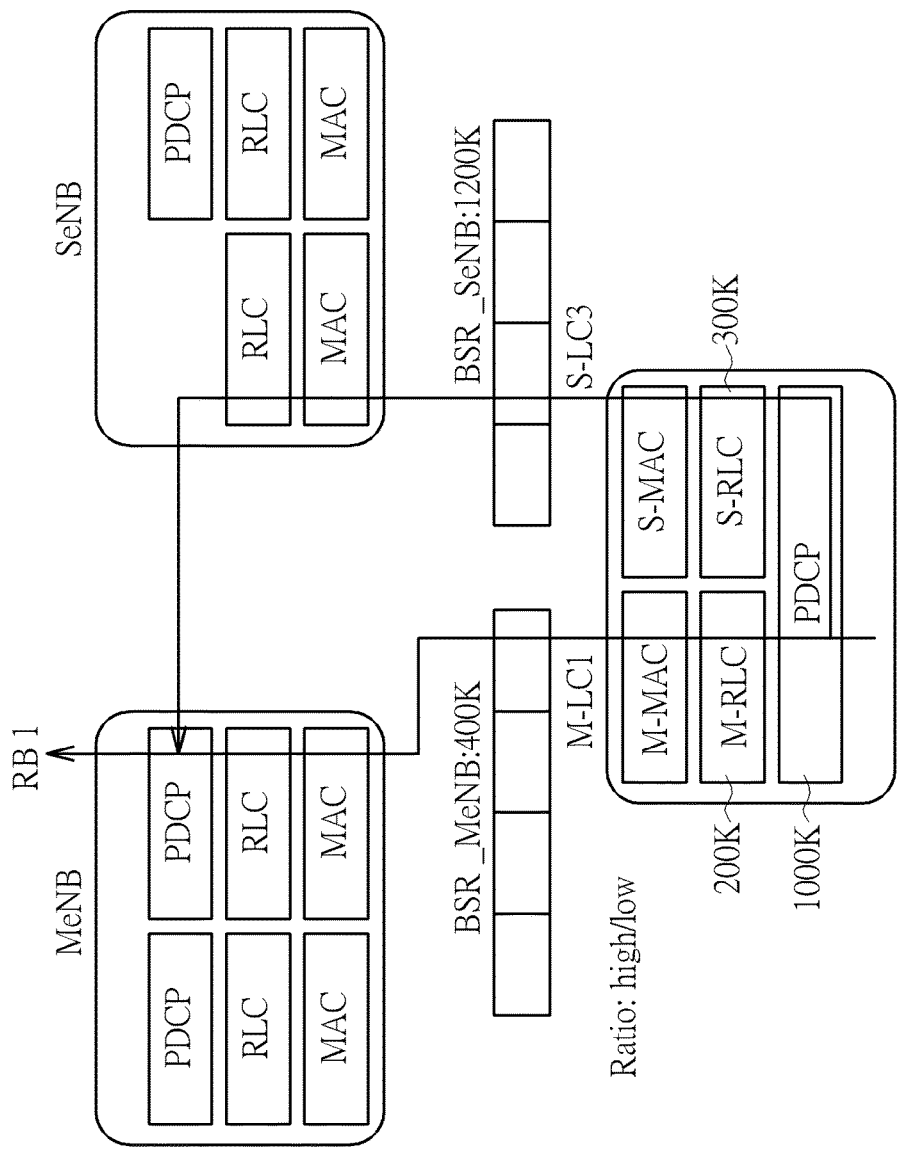

As to BSR reporting, please refer to FIGS. 20 and 21. FIG. 20 illustrates a mapping table for mapping the loading information of configuration to a ratio. FIG. 21 illustrates a schematic diagram of a BSR for a split radio bearer according to the present invention. As shown in FIG. 21, the UE receives the configuration including loading information for the MeNB is high and loading information for the SeNB is low. After receiving the loading information, the UE determines how much ratio of uplink data in PDCP buffer should be counted in the BSRs for the MeNB and SeNB according to the mapping table. In this example, the ratio for the MeNB is 0.2 and the ratio for the SeNB is 0.9. Thus, buffer size indicated by the first BSR to the MeNB is 400 k bytes (1000 k×0.2+200 k) and the second BSR to the SeNB is 1200 k bytes (1000 k×0.9+300 k). After the MeNB and SeNB receive the first and second BSRs from the UE, the MeNB and the SeNB allocate uplink resource to the UE according to the received BSRs. In this embodiment, the MeNB allocates 400 k bytes and the SeNB allocates 1200 k bytes to the UE.

Furthermore, the ratio for calculating buffer size in BSR could be applied to the abovementioned calculation schemes as disclosed in FIGS. 7-9, 13-14 and 21.

Besides, the BSR configuration may include a threshold for a caution report transmission from the UE to the MeNB to request changing parameters for the BSR configuration. Please refer to FIG. 22, which illustrates a message sequence chart for caution report transmission according to the present invention. In this embodiment, the configuration including the ratio as well as the threshold for caution report is generated by MeNB and MeNB may transmit this configuration to the UE, or the MeNB may transmit this configuration via SeNB to UE with abovementioned coordination operation. After receiving the configuration including the ratio, the UE shall calculate buffer size for the corresponding BSRs to the MeNB and the SeNB, and transmit the BSRs to the MeNB and the SeNB. In addition, the UE may monitor the condition of RLC buffers for the MeNB and SeNB. If the ratio of the size of RLC buffer of MeNB and the size of RLC buffer of SeNB exceeds the threshold of the configuration, the UE sends the caution report to the MeNB or via SeNB to the MeNB. The MeNB may then transmit the configuration with new ratio and/or new threshold.

Figure 23:
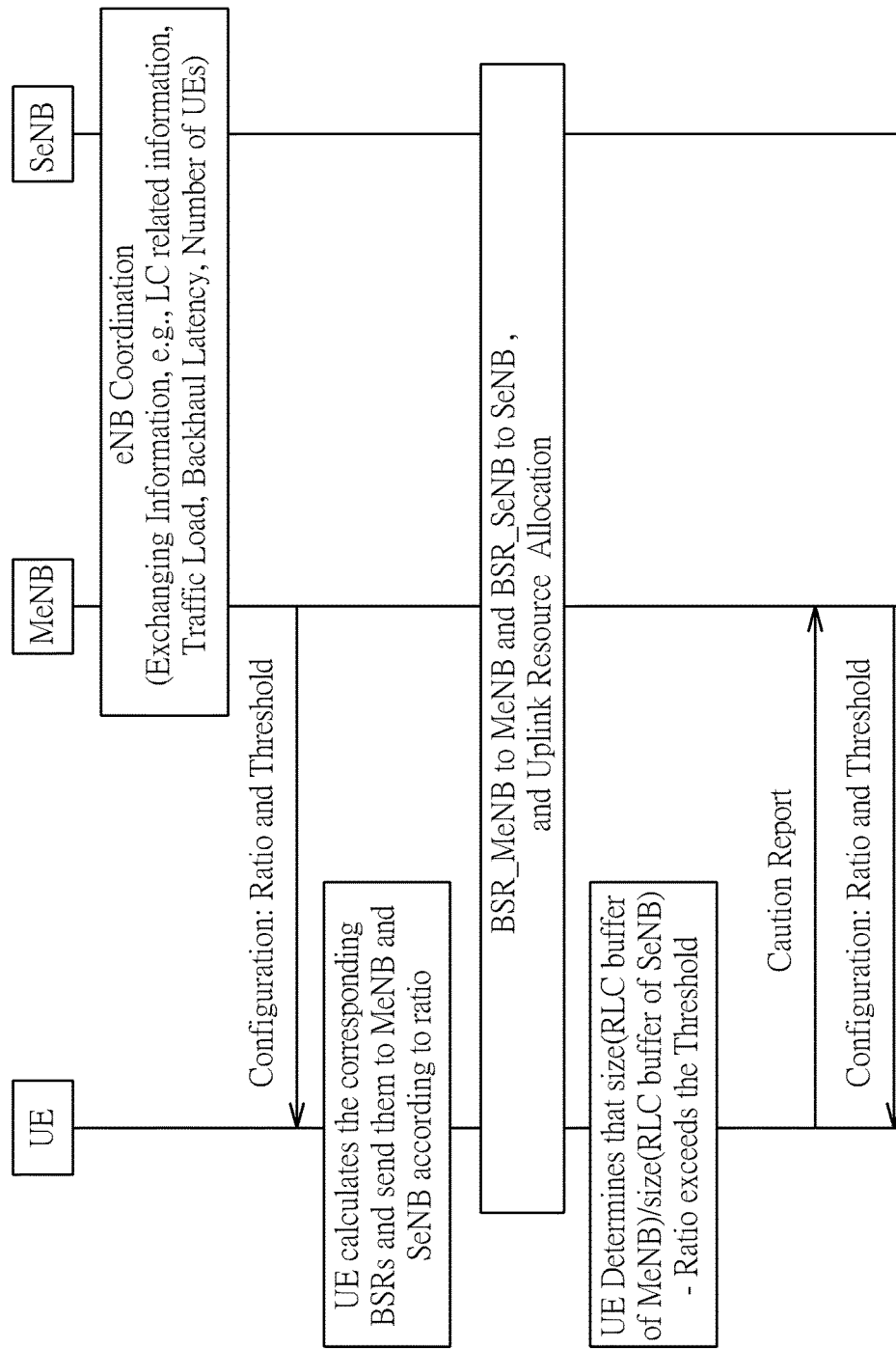

Alternatively, as shown in FIG. 23, the UE sends the caution report to MeNB if the value of (ratio of the size of RLC buffer for the MeNB and the size of RLC buffer for SeNB) minus the configured ratio exceeds the threshold. Then, the MeNB transmits the configuration with new ratio and/or new threshold.

Figure 22:
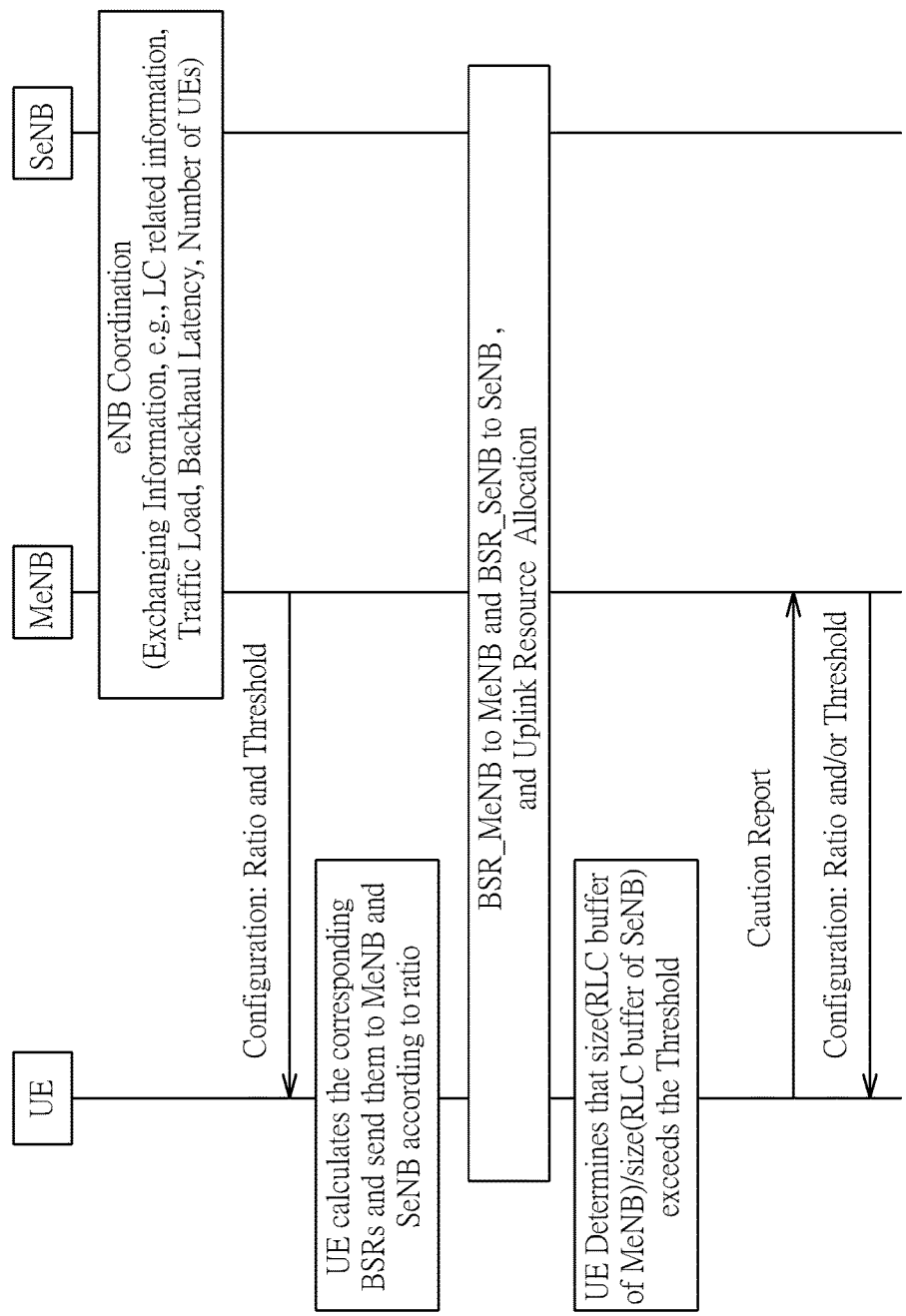
Figure 24:
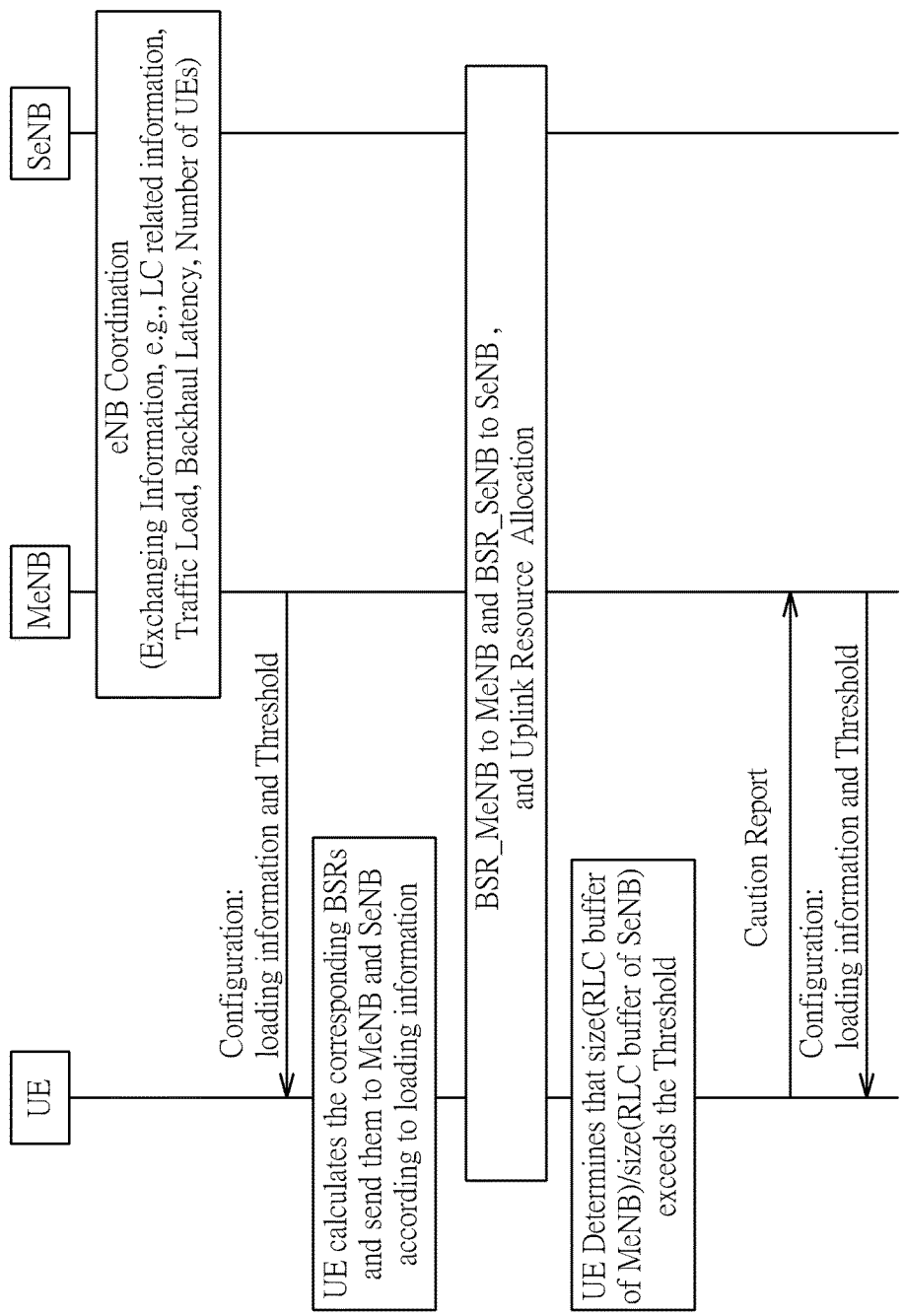
Figure 25:
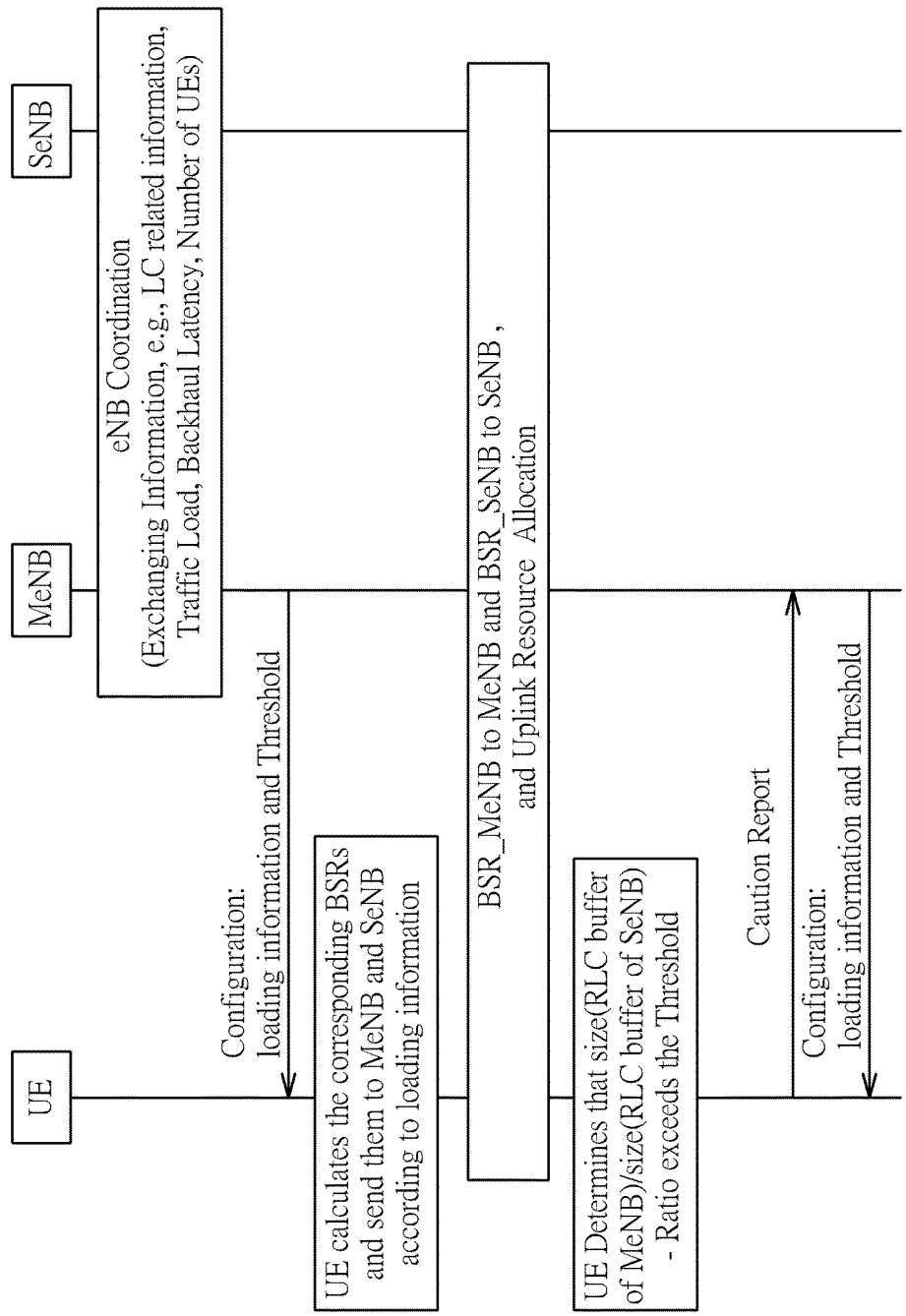

Compared to FIGS. 22-23, the configurations shown in FIGS. 24-25 include the loading information as well as the corresponding threshold. The detailed description for caution report transmission criteria can be referred from above, so it is omitted herein.

Figure 26:
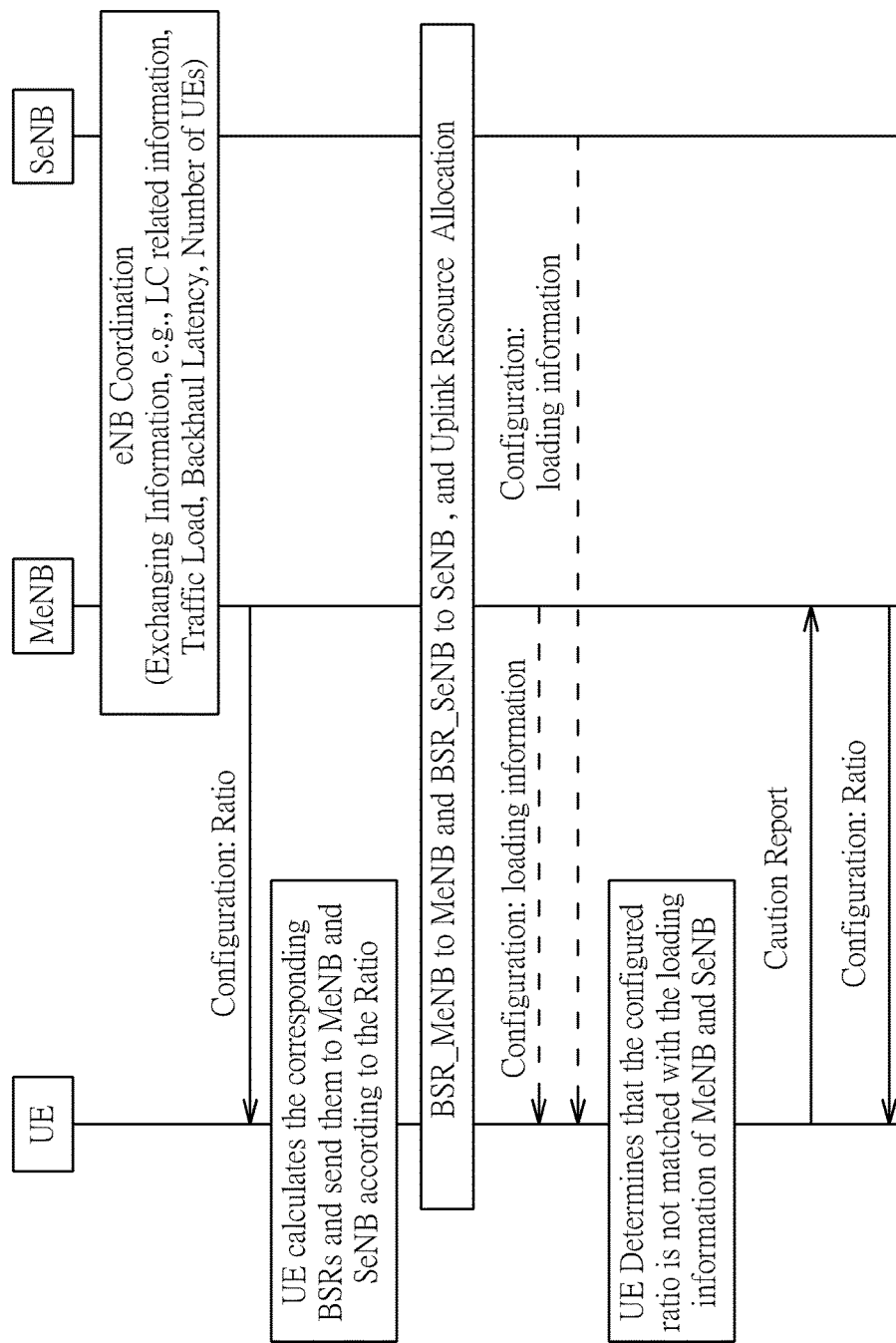

In other embodiment, the UE determines whether the ratio of the configuration is matched to the current loading information of the configuration transmitted from the MeNB and SeNB (shown in FIG. 26). If the UE determines that the configured ratio is not matched with the loading information for the MeNB and SeNB (i.e. by looking up from the mapping table shown in FIG. 20), the UE would send the caution report to MeNB or via the SeNB to the MeNB. The MeNB may then transmit the next configuration with new ratio.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 40.

In conclusion, the present invention addresses to BSR reporting for split radio bearer. In detail, the present invention provides calculation method for calculating BSR for split radio bearer, and eNB coordination for uplink resource allocation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for buffer status report (BSR) in dual connectivity for a communication device in a wireless communication system, the method comprising:
    connecting to at least two base stations including a first base station and a second base station in the wireless communication system;
    receiving a BSR configuration from the first base station, wherein the BSR configuration indicates a calculation scheme for a BSR; and
    calculating buffer sizes indicated in a first BSR and a second BSR respectively for the first base station and the second base station according to the calculation scheme in the received BSR configuration, wherein at least a first logical channel of a first logical channel group reported by the first BSR and at least a second logical channel of a second logical channel group reported by the second BSR are mapped to a same split radio bearer;
    wherein the calculation scheme indicates that a buffer size indicated in a BSR for a logical channel group is a sum of total data amount in packet data convergence protocol (PDCP) buffers of radio bearers belonging to the logical channel group and total data amount in radio link control (RLC) buffers of logical channels mapped to the radio bearers belonging to the logical channel group.

2. The method of claim 1, wherein the calculation scheme indicates that a buffer size indicated in the BSR for a logical channel group is sum of total data amount in packet data convergence protocol (PDCP) buffers of radio bearers belonging to the logical channel group, total data amount in radio link control (RLC) buffers of logical channels mapped to the radio bearers belonging to the logical channel group, and total data amount in other RLC buffers of logical channels mapped to the same split radio bearer among the radio bearers belonging to the logical channel group.

3. The method of claim 1, wherein the calculation scheme indicates that a buffer size indicated in the BSR for a logical channel group includes two values of data amount in packet data convergence protocol (PDCP) buffers of radio bearers belonging to the logical channel group, and data amount in radio link control (RLC) buffers of logical channels mapped to the radio bearers belonging to the logical channel group.

4. The method of claim 1, wherein the BSR configuration further includes first and second ratios ratio of uplink resources allocation for the first and second base stations, loading information of the first base station and the second base station, a threshold, and an indicator for indicating which base station the communication device should send a BSR report to.

5. The method of claim 1, wherein the calculating scheme indicates that a buffer size indicated in a BSR for a logical channel group is the sum of a ratio of total data amount in packet data convergence protocol (PDCP) buffers of radio bearers belonging to the logical channel group and total data amount in radio link control (RLC) buffers of logical channels mapped to the radio bearers belonging to the logical channel group.

6. The method of claim 1, wherein the calculation scheme indicates that a buffer size indicated in the BSR for a logical channel group is sum of a ratio of total data amount in packet data convergence protocol (PDCP) buffers of radio bearers belonging to the logical channel group, total data amount in radio link control (RLC) buffers of logical channels mapped to the radio bearers belonging to the logical channel group, and total data amount in other RLC buffers of logical channels mapped to the same split radio bearer among the radio bearers belonging to the logical channel group.

7. The method of claim 5, wherein the ratio is determined by coordination between the first base station and the second base station and included in the received BSR configuration or determined by loading information of the first base station and the second base station in the received BSR configuration.

8. The method of claim 6, wherein the ratio is determined by coordination between the first base station and the second base station and included in the received BSR configuration or determined by loading information of the first base station and the second base station in the received BSR configuration.

9. The method of claim 4, further comprising:
    determining whether to send a caution report to the first base station for BSR reconfiguration according to at least one of threshold, loading information and the first and second ratios in the BSR configuration.

10. The method of claim 9, wherein the determining step comprises:
    determining whether to send the caution report to the first base station for BSR reconfiguration according to comparison of a ratio of total data amount in radio link control (RLC) buffers of logical channels in the first logical channel group and total data amount in other RLC buffers of logical channels mapped to the split radio bearers belonging to the first logical channel group with the threshold of the BSR configuration, or according to comparison of the first and second ratios for the first base station and the second base station to the loading information of the first base station and the second base station in the BR configuration.

11. The method of claim 1, further comprising:
    sending the first and second BSRs to the first and second base stations;
    receiving uplink resource from the first base station and the second base station after sending the BSRs, wherein the uplink resource is allocated with coordination between the first base station and the second base station for how much uplink resource should be allocated respectively to the communication device; and
    sending uplink data to the first base station and second base station according to the uplink resource allocations from the first base station and the second base station.

12. A method for buffer status report (BSR) in dual connectivity for a first base station in a wireless communication system, the method comprising:
- coordinating to a second base station of the wireless communication system by exchanging information of at least one of mapping information of a radio bearer, a logical channel and a logical channel group (LCG), backhaul latency, loading of the first base station and the second base station, a number of communication devices in the first base station and the second base station, how much ratio of uplink data that the first base station and the second base station in charge of, and an amount uplink data per time unit for the first base station and the second base station; and
- assigning a BSR configuration to a communication device of the wireless communication system to indicate the communication device how to calculate a buffer size indicated in a BSR;
- wherein the BSR configuration includes ratios of uplink resources allocation for the first base station and the second base station, wherein the ratios of uplink resource allocation is determined by the first base station or by coordination between the first base station and the second base station, loading information of the first base station and the second base station, a threshold, and an indicator for indicating which base station the communication device should send the BSR to.

13. The method of claim 12, further comprising:
receiving a BSR from the communication device; and
allocating uplink resource to the communication device according to the BSR.

14. The method of claim 13, wherein the coordinating step comprises:
coordinating to the second base station for uplink resource allocation according to the BSR received from the communication device.

15. The method of claim 12, further comprising:
allocating uplink resource to the communication device according to the exchanging information in coordination.

16. The method of claim 12, further comprising:
receiving a caution report from the communication device; and
assigning a new BSR configuration to the communication device when receiving the caution report from the communication device.

* * * * *